US008699353B2

(12) United States Patent
Elie-Dit-Cosaque et al.

(10) Patent No.: US 8,699,353 B2
(45) Date of Patent: *Apr. 15, 2014

(54) ALARM INDICATION AND SUPPRESSION (AIS) MECHANISM IN AN ETHERNET OAM NETWORK

(75) Inventors: David Elie-Dit-Cosaque, Richardson, TX (US); Kamakshi Sridhar, Plano, TX (US); Maarten Petrus Joseph Vissers, Huizen (NL); Tony Van Kerckhove, Antwerp (BE)

(73) Assignee: Alcatel Lucent, Paris (FR)

( * ) Notice: Subject to any disclaimer, the term of this patent is extended or adjusted under 35 U.S.C. 154(b) by 445 days.

This patent is subject to a terminal disclaimer.

(21) Appl. No.: 12/950,715

(22) Filed: Nov. 19, 2010

(65) Prior Publication Data

US 2011/0116363 A1 May 19, 2011

Related U.S. Application Data

(63) Continuation of application No. 11/023,784, filed on Dec. 28, 2004, now Pat. No. 7,855,968.

(60) Provisional application No. 60/589,722, filed on May 10, 2004, provisional application No. 60/586,254, filed on Jul. 8, 2004.

(51) Int. Cl.
*H04J 3/14* (2006.01)

(52) U.S. Cl.
USPC .................................. 370/241.1; 370/236.2

(58) Field of Classification Search
USPC ............ 370/236.2, 240–249, 295.1; 709/224
See application file for complete search history.

(56) References Cited

U.S. PATENT DOCUMENTS

| 2003/0058106 | A1* | 3/2003 | Ikematsu ................... 340/568.1 |
| 2004/0160895 | A1* | 8/2004 | Holmgren et al. ........... 370/223 |
| 2004/0184407 | A1* | 9/2004 | Pok et al. .................... 370/236 |
| 2005/0099955 | A1* | 5/2005 | Mohan et al. ............... 370/242 |
| 2006/0092847 | A1* | 5/2006 | Mohan ....................... 370/241.1 |

* cited by examiner

*Primary Examiner* — Awet Haile
(74) *Attorney, Agent, or Firm* — Garlick and Markison

(57) ABSTRACT

A system and method for propagating fault information in an Ethernet OAM network having multiple levels of OAM domains. An Alarm Indication and Suppression (AIS) frame is generated by a Maintenance Intermediate Point (MIP) node upon detecting a fault condition in a first OAM domain, which is transmitted to one or more Maintenance End Points (MEPs) of the first OAM domain. Upon receiving the AIS frames, the MEP nodes are operable generate another AIS frame for propagating to an adjacent higher level second OAM domain. Responsive to the AIS frame from the lower level first OAM domain, any alarms caused in the second OAM domain due to the fault condition in the first OAM domain are suppressed.

21 Claims, 18 Drawing Sheets

ALARM INDICATION AND SUPPRESSION (AIS) MECHANISM IN AN ETHERNET OAM NETWORK

CROSS-REFERENCE TO RELATED APPLICATIONS

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. Utility application Ser. No. 11/023,784, entitled "ALARM INDICATION AND SUPPRESSION (AIS) MECHANISM IN AN ETHERNET OAM NETWORK,", filed Dec. 28, 2004, pending, which claims priority pursuant to 35 U.S.C. §119(e) to the following U.S. Provisional Patent Applications which are hereby incorporated herein by reference in their entirety and made part of the present U.S. Utility Patent Application for all purposes:

a. U.S. Provisional Application Ser. No. 60/569,722, entitled "ETHERNET ALARM INDICATION SIGNAL (ETHAIS),", filed May 10, 2004, expired, and b. U.S. Provisional Application Ser. No. 60/586,254, entitled "ENHANCEMENTS TO ETHERNET AIS,", filed Jul. 8, 2004, expired.

BACKGROUND OF THE INVENTION

1. Technical Field of the Invention

The present invention generally relates to Ethernet OAM networks. More particularly, and not by way of any limitation, the present invention is directed to a system and method for propagating fault information and suppressing alarm indication signaling in an Ethernet OAM network.

2. Description of Related Art

The link between the end user and the public network, essential key to the delivery of broadband applications to residential and business subscribers, is known by many names, e.g., first mile, last mile, local loop, metro access, subscriber access network, etc., and is implemented using a variety of different transport technologies and protocols over diverse physical connections. For instance, today most users connect to the public network with Digital Subscriber Line (DSL), Integrated Services Digital Network (ISDN), cable TV, T1/E1 or T3/E3 lines, using Synchronous Optical Network and its companion Synchronous Digital Hierarchy (SONET/SDH), Frame Relay and Asynchronous Transfer Mode (ATM). Regardless of the nomenclature or the actual implementation, all access networks require operations, administration and maintenance (OAM) support features to ensure the maintainability and uptime required to provide broadband services.

Current first/last mile solutions have significant shortcomings from the customer's perspective, ranging from performance bottlenecks, fixed bandwidth provisioning, limited scalability, lack of flexibility and provisioning complexity to end-to-end quality of service (QoS) issues and a high cost structure. The use of robust, simple Ethernet technology in the first mile promises to revolutionize the access network as it did the enterprise network. Ethernet is a local area network (LAN) transport technology that is used ubiquitously in the home and in business to communicate between computers and networks. As an access technology, Ethernet offers three significant advantages over legacy first mile technologies: (i) future-proof transport for data, video and voice applications; (ii) cost-effective infrastructure for data services; and (iii) simple, globally accepted standard that will ensure interoperability.

In order to adapt the Ethernet technology in a carrier-grade service environment, various standards are being developed that aim to provide advanced OAM capabilities (also referred to as Ethernet Connectivity and Fault Management or Ethernet CFM) across the entire network from one end to the other end. Since the end-to-end service network environment is typically comprised of a patchwork of diverse component networks (e.g., metro access networks and core networks using a variety of technologies) that may belong to different organizations, network operators and service providers, the Ethernet OAM plane is envisioned as a hierarchically layered domain space wherein specific OAM domains are defined corresponding to the constituent network infrastructure and provisioning. In particular, two standards, IEEE 802.1ag and ITU-T (Question 3, Study Group 13), incorporated by reference herein, that are specifically concerned with end-to-end Ethernet OAM define a customer-level domain at the highest level of hierarchy, which comprises one or more provider domains (occupying an intermediate level), each of which in turn includes one or more operator domains disposed at a lower hierarchical level. By way of standardization, the OAM domain space may be partitioned into up to a number of levels, e.g., 8 levels, each domain corresponding to a particular level, wherein a domain is defined in terms of what are referred to as flow points. In the context of the IEEE 802 specification suite, the flow points are new entities contained in Media Access Control (MAC) "interfaces" and "ports" as defined in related standards documentation. A flow point at the edge of an OAM domain is called a "Maintenance End Point" or MEP. A flow point inside a domain and visible to a MEP is called a "Maintenance Intermediate Point" or MIP. Whereas MEP nodes are used by system administrators to initiate and monitor OAM activity (by issuing appropriate OAM frames), MIP nodes passively receive and respond to OAM flows initiated by MEP nodes. An OAM domain having one or more MIP nodes is bounded by two or more MEP nodes, wherein a "Maintenance Entity" (ME) is defined to include a set of MIP nodes disposed between one MEP node and another MEP node. Thus it is possible to have more than one ME in a particular OAM domain.

Although the Ethernet OAM architecture as currently being standardized provides an impressive framework for addressing end-to-end Ethernet Connectivity and Fault Management at any level of the OAM hierarchy, a number of issues remain to be solved as will be set forth in detail hereinbelow.

SUMMARY OF THE INVENTION

In an embodiment, a method is disclosed for propagating fault information in an Ethernet OAM network having multiple levels of OAM domains. In an MEP node associated with a first OAM domain having a first assigned level, the MEP determines that a loss of Continuity Check (CC) frames has occurred in the first OAM domain. The MEP receives an Ethernet AIS frame, wherein the Ethernet AIS frame indicates a fault condition has been detected in a second OAM domain having a second assigned level; and responsive to the Ethernet AIS frame, suppresses generation of an alarm due to the loss of Continuity Check frames in the first OAM domain. In an embodiment, the first assigned level of the first OAM domain is at a higher hierarchical OAM domain level than the second assigned level of the second OAM domain.

In another embodiment, in an Ethernet network having multiple designated hierarchical levels of maintenance entities bounded by two or more MEP nodes, the network includes a first MEP node and a second MEP node. The first MEP node bounds a first lower level maintenance entity and is configured to, responsive to determining a fault condition in the first lower level maintenance entity, generate an AIS frame that indicates the fault condition has occurred in the first lower level maintenance entity. The second MEP node bounds a second higher level maintenance entity and is configured to receive the AIS frame. When the second MEP node detects that a loss of Continuity Check (CC) frames has occurred in the second higher level maintenance entity, responsive to the AIS frame, it suppress generation of a loss of continuity alarm that would indicate the loss of CC frames in the second higher level maintenance entity. In an embodiment, the first MEP node is a first bridge node in the Ethernet network and is configured as a MEP of the first maintenance entity level and the second MEP node is a second bridge node in the Ethernet network and is configured as a MEP of the second maintenance entity level.

BRIEF DESCRIPTION OF THE DRAWINGS

The accompanying drawings are incorporated into and form a part of the specification to illustrate one or more presently preferred exemplary embodiments of the present invention. Various advantages and features of the invention will be understood from the following Detailed Description taken in connection with the appended claims and with reference to the attached drawing figures in which:

DETAILED DESCRIPTION OF THE DRAWINGS

Figure 1:
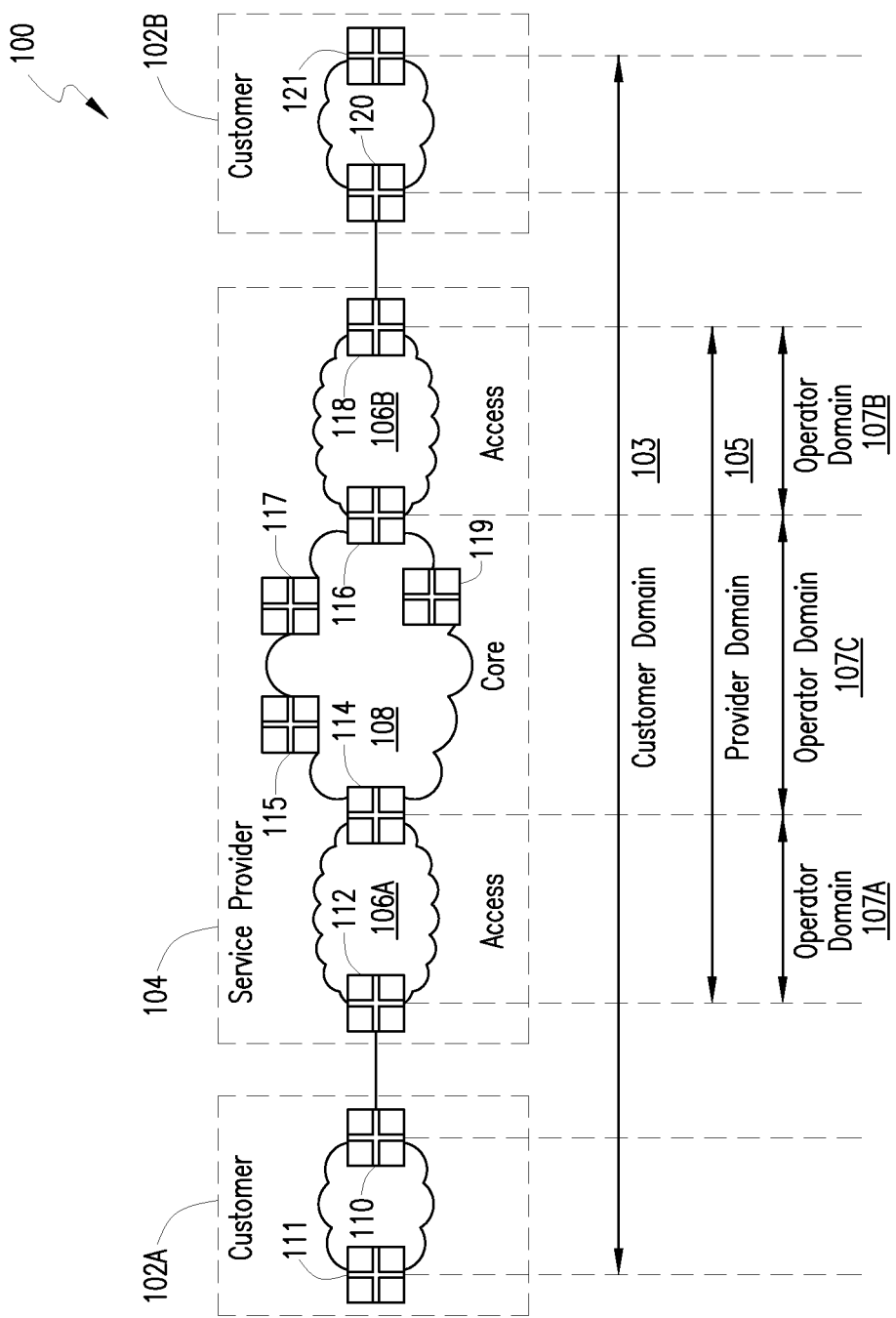
FIG. 1 depicts an embodiment of an end-to-end Ethernet OAM network having a plurality of OAM domains.

Embodiments of the invention will now be described with reference to various examples of how the invention can best be made and used. Like reference numerals are used throughout the description and several views of the drawings to indicate like or corresponding parts, wherein the various elements are not necessarily drawn to scale. Referring now to the drawings, and more particularly to FIG. 1, depicted therein is an embodiment of an end-to-end Ethernet OAM network 100 having a plurality of OAM domains wherein an Ethernet AIS frame generation and propagation scheme may be provided in accordance with an aspect of the present invention. As illustrated, the Ethernet OAM network 100 is comprised of a hierarchically layered network environment including a first customer premises network 102A and a second customer premises network 102B that form the terminal portions thereof, which in turn are connected by means of respective access networks 106A and 106B to a core transport network 108. Whereas a single service provider may administer the provisioning of end-to-end service between the two customers, one or more operators may in fact be involved in providing and maintaining the underlying network infrastructure. Accordingly, the access and core networks may comprise various diverse network and transport technologies and protocols for effectuating an end-to-end carrier-grade Ethernet service between the terminal customer networks 102A and 102B. For example, these assorted technologies may include Ethernet over SONET/SDH, Ethernet over ATM, Ethernet over Resilient Packet Ring (RPR), Ethernet over Multiprotocol Label Switching (MPLS), Ethernet over Internet Protocol (IP), etcetera.

The various network portions of the Ethernet OAM network 100 and their constituent segments are interconnected using appropriate forwarding entities such as bridges and switches. By way of illustration, entities 111, 110 and 120, 121 are exemplary of customer equipment disposed in the respective customer networks 102A and 102B. Likewise, entities 112 and 118 of access networks 106A and 106B are operable to interface with the respective customer equipment 110 and 120. Interfacing between the access networks 106A, 106B and the core network 108 is effectuated by means of entities 114 and 116, respectively. In addition to the interfacing entities, a particular network may include a number of additional entities within that network. For example, entities 115, 117 and 119 are exemplary equipment within the core network 108, wherein point-to-multipoint operations may be effectuated.

As alluded to in the Background section of the present patent application, the Ethernet OAM architecture of a hierarchically layered end-to-end carrier-grade Ethernet service network such as the Ethernet network 100 is logically segmented into a number of OAM domains having a designated hierarchy of domain levels. With respect to the Ethernet OAM network 100 of FIG. 1, a customer domain 103, a provider domain 105 and one or more operator domains 107A-107C are exemplified, each of which is bounded by multiple MEP nodes and includes one or more MIP nodes disposed therebetween. Whereas MEP nodes are operable to initiate various OAM commands and associated frames, e.g., Continuity Check (CC), TraceRoute, Ping, etcetera, MIP nodes passively receive and respond to the incoming OAM frames based on domain-level compatibility.

It should be appreciated by those skilled in the art that by virtue of MEP and MIP provisioning, a static partitioning of the Ethernet OAM network is effectuated whereby MEP nodes demarcate the boundaries of nonintersecting Ethernet domains such that OAM frame leakage from one domain to another is curtailed. That is, OAM frames intended for one domain are required to stay within that domain for processing while all other OAM frames are filtered out. Further, MEP and MIP nodes are provisionable within an Ethernet OAM network such that it is possible to define a number of easily manageable Maintenance Entity (ME) domains depending on business and service models and deployment scenarios. Due to the hierarchical arrangement of the OAM domains, customer-level domains are disposed at a higher hierarchical level than the service provider domains, which in turn are disposed at a higher level than operator-level domains. Accordingly, in terms of visibility and awareness, operator-level domains have higher OAM visibility than service provider-level domains, which in turn have higher visibility than customer-level domains. Thus, whereas an operator OAM domain has knowledge of both service provider and customer domains, the converse is not true. Likewise, a service provider domain has knowledge of customer domains but not vice versa.

As set forth in the IEEE 802.1ag specification documentation referenced hereinabove, various rules govern the treatment of Ethernet packets/frames as they move from one domain level to another. MEP nodes are operable to issue OAM frames to all other MEP nodes across the level/OAM domains, while a MIP node can interact only with the MEP nodes of its domain. Each MIP node at a higher domain level is also operable as a MEP node for the next hierarchical layer below. Thus a single piece of forwarding entity equipment (e.g., a bridge) may have both MIP and MEP nodes thereat that are of different levels. Because of the boundedness of OAM flows, frames at a given level i, i=1, 2, . . . , N, remain at that level. The levels of OAM frames are encoded therein depending on the domain levels assigned to the MEP nodes originating the OAM frames. Further, OAM frames are either processed or discarded by the same level MIP/MEP nodes subject to the following conditions: (i) an OAM frame is discarded when originated from outside the instant OAM domain, and (ii) an OAM frame is processed when originated within the instant OAM domain. Due to the hierarchical nature of OAM visibility, frames from lower maintenance domain levels (e.g., operator) are relayed transparently by MEP/MIP nodes disposed at higher domain levels (e.g., customer). On the other hand, higher domain OAM frames (e.g, originated by customer-level MEP nodes) are always processed by lower level MEP/MIP nodes (e.g., operator-level nodes).

Figure 2:
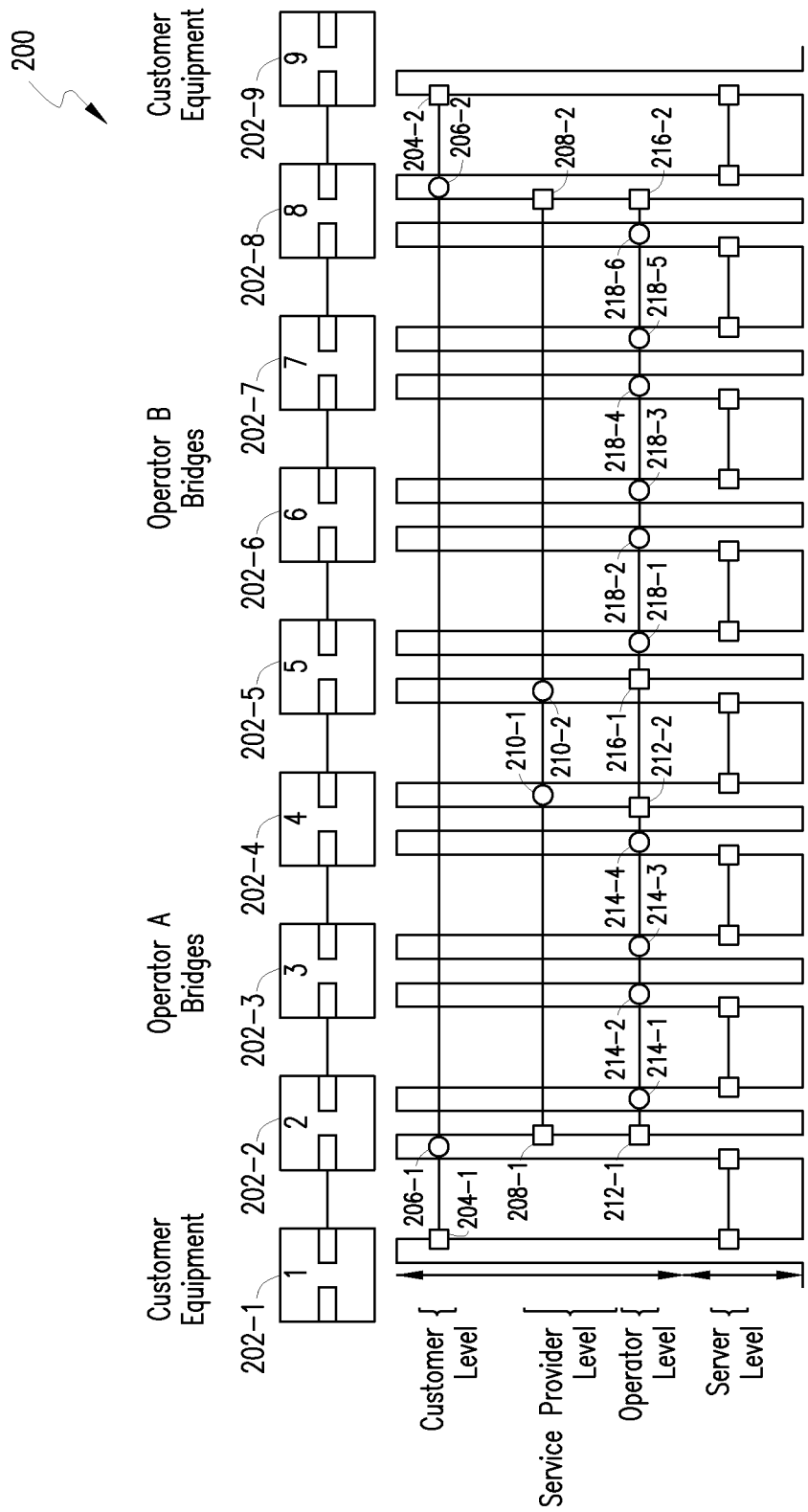
FIG. 2 depicts an exemplary hierarchical OAM layering scheme operable with respect to an end-to-end Ethernet network.

FIG. 2 depicts an exemplary hierarchical OAM layering scheme 200 operable with respect to an end-to-end Ethernet network such as e.g., network 100 shown in FIG. 1, wherein a plurality of Ethernet bridges are illustrative of forwarding entities having MIP/MEP nodes at different domain levels. Reference numerals 202-1 and 202-9 refer to customer bridge equipment disposed at the two ends of the network. Two operator networks, Operator-A and Operator-B, are deployed between the customer equipment 202-1 and 202-9, wherein Operator-A network comprises bridges 202-2 through 202-4 and Operator-B network comprises bridges 202-5 through 202-9. At customer level, the OAM domain is bounded by MEP nodes 204-1 and 204-2 effectuated at customer bridge equipment 202-1 and 202-9, respectively, which includes two MIP nodes 206-1 and 206-2 that are effectuated at Operator-A bridge 202-2 and Operator-B bridge 202-8, respectively. Beneath the customer-level MIP nodes 206-1 and 206-2 are disposed two MEP nodes 208-1 and 208-2, also effectuated at Operator-A bridge 202-2 and Operator-B bridge 202-8, respectively, that bound the service provider-level OAM domain. Within this domain, a MIP node 210-1 effectuated at Operator-A bridge 202-4 is interfaced with another MIP node 210-2 effectuated at Operator-B bridge 202-5. Two operator-level domains are defined that correspond to the two operator networks, wherein operator-level MEP nodes 212-1 (effectuated at Operator-A bridge 202-2) and 212-2 (effectuated at Operator-A bridge 202-4) bound one operator domain and operator-level MEP nodes 216-1 (effectuated at Operator-B bridge 202-5) and 216-2 (effectuated at Operator-B bridge 202-8) bound the other operator domain. Further, MIP nodes 214-1 through 214-4 are disposed in the operator-level domain defined by the MEP nodes 212-1 and 212-2, wherein bridge 202-2 effectuates MIP node 214-1, bridge 202-3 effectuates MIP nodes 214-2 and 214-3, and bridge 202-4 effectuates MIP node 214-4. Likewise, MIP nodes 218-1 through 218-6 are disposed in the operator-level domain defined by the MEP nodes 216-1 and 216-2, wherein bridge 202-5 effectuates MIP node 218-1, bridge 202-6 effectuates MIP nodes 218-2 and 218-3, bridge 202-7 effectuates MIP nodes 218-4 and 218-5 and, finally, bridge 202-8 effectuates MIP node 218-6.

Figure 3:
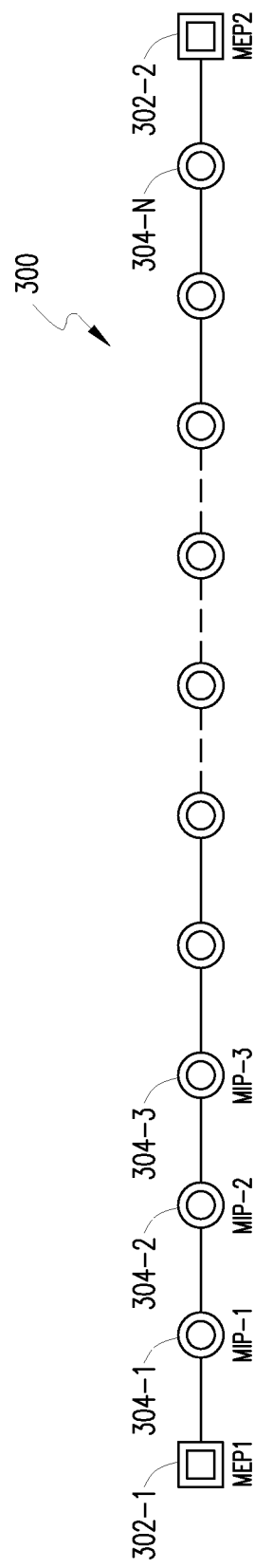
FIG. 3 depicts an exemplary embodiment of an OAM domain bounded by a pair of MEP nodes.

Based on the foregoing discussion, it should be apparent that a single network entity may be operable to effectuate one or more MIP/MEP nodes at different levels depending on its deployment and OAM service provisioning. By way of illustration, it can be seen that bridge entity 202-2 effectuates the processing and logic of customer-level MIP node 206-1, service provider-level MEP 208-1, operator-level MEP 212-1 as well as operator-level MIP 214-2. Accordingly, the physical equipment of an Ethernet network represents a flat, "vertically-compressed" layer that is logically expandable into a number of hierarchical levels where, at any one level, an OAM domain may be abstracted as a concatenation of a plurality of MIP nodes bounded by multiple MEP nodes. In essence, FIG. 3 depicts such an exemplary embodiment of an OAM domain 300 including MIP nodes 304-1 through 304-N that are bounded by a pair of MEP nodes 302-1 and 302-2, which represents a particular case of point-to-point operation. It will be realized that in the point-to-multipoint case, more than two MEPs are provided to bound an OAM domain (as seen, e.g., in the core network portion 108 of FIG. 1).

As alluded to hereinabove, MEP nodes are operable to originate various OAM frames which may be used for effectuating such OAM service functions as discovery, connectivity verification, latency/loss measurements, delay variation measurements, etcetera, within an end-to-end Ethernet network. In general, the OAM frames are issued on a per-Ethernet Virtual Connection (per-EVC) basis and look like user data frames, but differentiated by using (i) certain predetermined multicast addresses for OAM discovery and (ii) certain predetermined EtherTypes for OAM. Also, because Ethernet as a connectionless transport technology has the property that packets may be sent to different entities within the network that need not or should not receive them (e.g., when the MAC address is not known), domain-based OAM barriers or filters are also encoded therein.

Figure 4A:
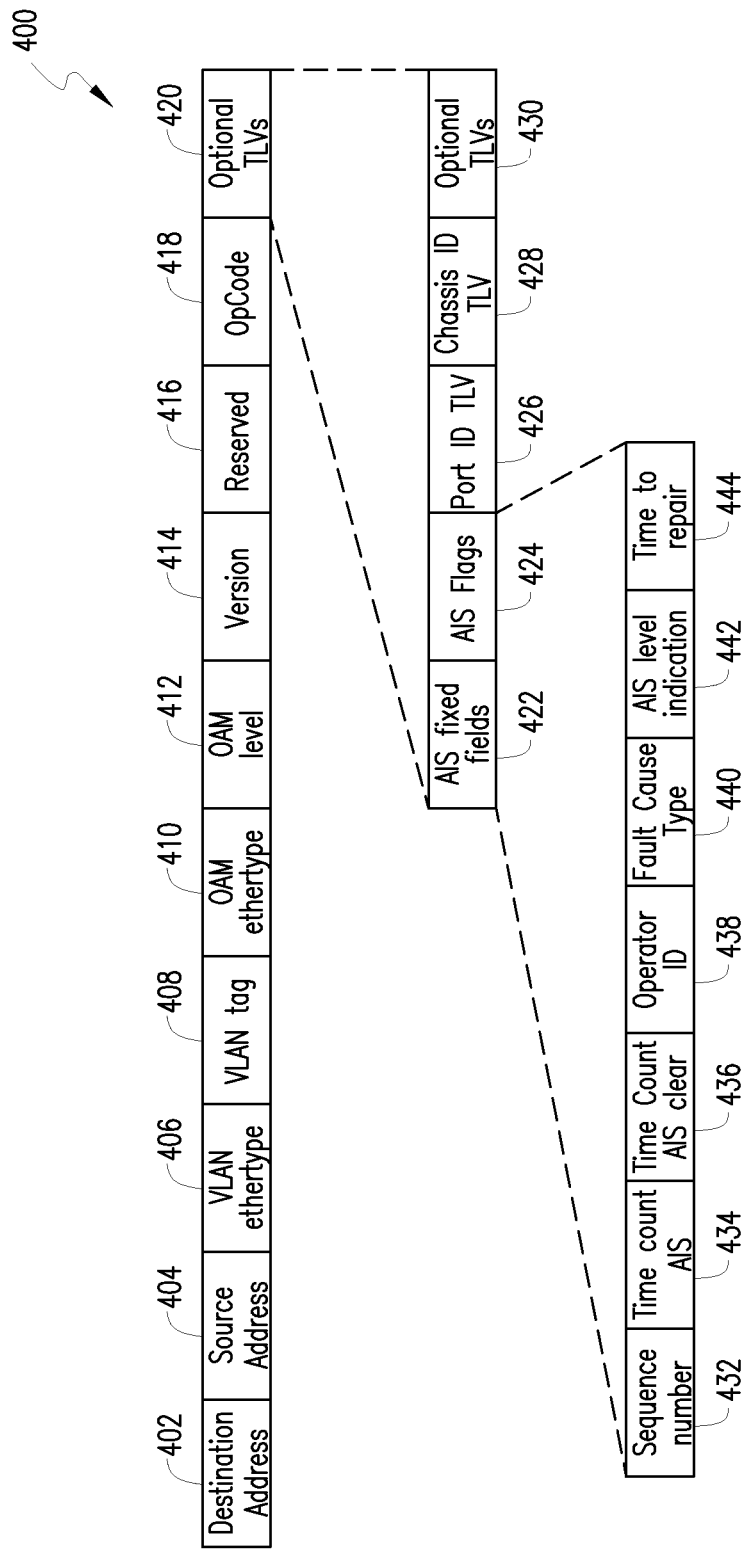
FIG. 4A depicts an Ethernet Alarm Indication and Suppression (EthAIS or AIS) frame having failure indication information fields according to one embodiment of the present invention.

FIG. 4A depicts an Ethernet Alarm Indication and Suppression (EthAIS or AIS) frame 400 having failure indication information fields according to one embodiment of the present invention. A number of fields such as Destination and Source MAC addresses 402 and 404, Virtual LAN (VLAN) EtherType 406, VLAN tag 408, OAM EtherType 410 and an OAM level field 412 are provided along with Version 414 and Reserved 416 fields. Additionally, although not shown in FIG. 4A, fields such as Preamble, Postamble, Cyclic Redundancy Check (CRC), etcetera, may also be included in the AIS frame 400. An opcode 418 and a number of opcode-specific optional Type Length Value (TLV) fields 420 are included in the AIS frame 400 for providing fault information. As will be seen in greater detail below, providing fault location and cause types in AIS frames facilitates an innovative scheme for distinguishing faults at one OAM level from faults at another OAM level as the AIS frames are propagated across the OAM domains in an Ethernet hierarchy.

Figure 4B:
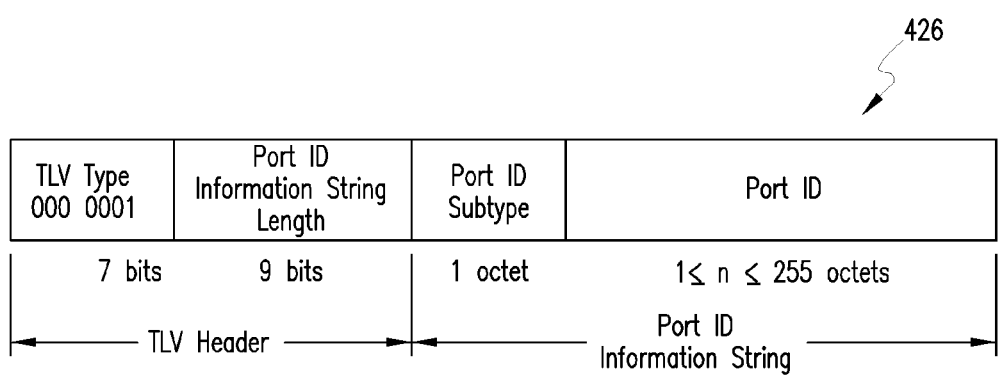
FIGS. 4B and 4C depict further details of the EthAIS frame shown in FIG. 4A.
Figure 4C:
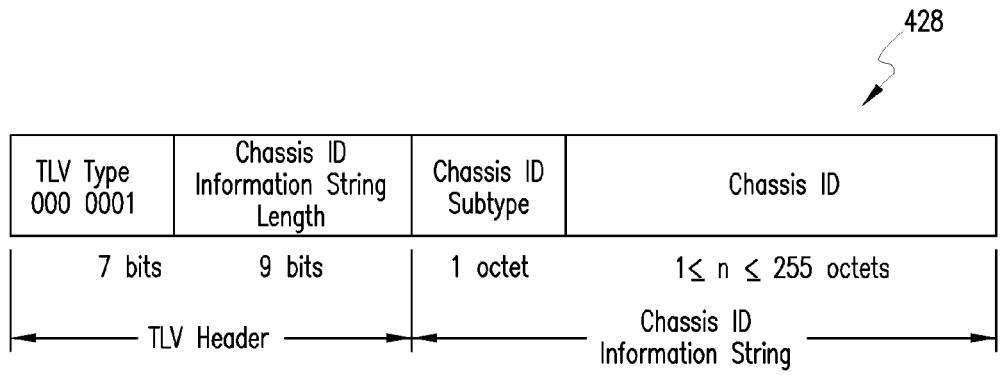

As illustrated, optional TLV field 420 may be comprised of a number of subfields, AIS Fixed fields 422, AIS Flags 424, Port ID TLV 426, Chassis ID TLV 428, and a subfield for additional optional TLVs 430. A "fault location" is therefore identified by way of the contents of Port ID TLV 426 and Chassis ID TLV 428 which are shown in further detail in FIGS. 4B and 4C, respectively. In one implementation, these fields are populated with IEEE 801.1ab MAC Service Access Point (MSAP) TLV that includes port ID and chassis ID. As part of the AIS propagation mechanism of the present invention, the receiving MEPs replace the MSAP of incoming AIS frames with their own MSAP.

Further differentiation of AIS Fixed fields 422 and AIS Flags 424 gives rise to a Sequence Number field 432, Time Count AIS field 434, Time Count AIS Clear field 436, Operator ID field 438, Fault Cause Type field 440, AIS Level Indication field 442 and Time to Repair field 444. The contents of Sequence Number field 432 uniquely identify an AIS frame transmitted due to a given fault location. Fault Cause Type 440 provides a mechanism to code different types of faults, e.g., link failure indication, congestion indication, CC frame loss, fault clear, etc. Operator ID 438 is operable to indicate which operator entity is responsible for handling the failure caused. AIS Level Indication 442 provides a mechanism to identify whether the AIS frames are from the current OAM domain level or not, which is used in determining whether to suppress alarms (if the AIS frame is from a lower OAM level) or not (if the AIS frame is from the current level).

To ensure reliability of the AIS frames, additional information is provided by way of fields such as Time Count AIS field 434, Time Count AIS Clear field 436, and Time to Repair field 444. The contents of Time Count AIS field 434 indicate how long a fault has been present (i.e., duration of time since the detection of the fault). In one implementation, for a sequence number, this field is incremented by one every time an AIS frame is generated. Time Count AIS Clear field 436 is operable to indicate an amount of time lapsed since a particular fault has been cleared. For a sequence number, this field is incremented by one every time an AIS Fault Clear frame is generated. Accordingly, even if some AIS frames are lost in transit as they are propagated through an Ethernet OAM hierarchy, Time Count AIS field 434 and Time Count AIS Clear field 436 would indicate the precise time in the past as to when a failure started or ended, respectively. For example, a Time Count AIS value of 100 indicates that a fault at the lower level was detected 100 seconds ago (based on the periodic generation of one AIS frame per second).

In general operation, Ethernet AIS frames are periodically generated by the MIP nodes adjacent to the link failures, and propagated to upper (i.e., higher) levels of an Ethernet OAM network. A MEP node receiving an AIS frame from the lower levels can recognize that the fault is in the lower domains, simply by examining the level indicator information in the AIS frame. Thereafter, the MEP node can suppress alarms to its Network Management System (NMS) at the current level that would have been generated due to CC frame loss (at that level) that is caused by the lower level fault. It should be noted, however, that link failures identified in the current OAM level are also indicated using the AIS frames (with the current level indication), and alarms due to such link failures are not suppressed and are sent to the NMS.

Figure 5:
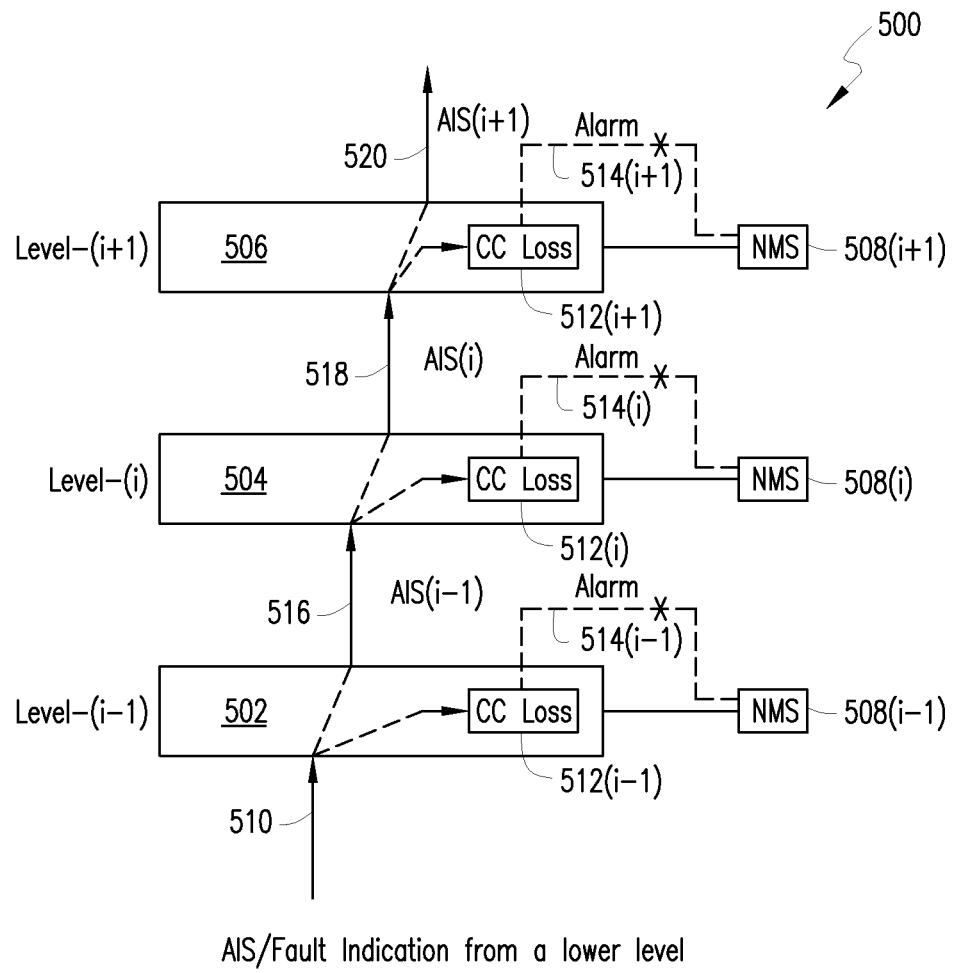
FIG. 5 depicts a generalized scheme for propagating EthAIS frames in an Ethernet OAM hierarchy according to one embodiment of the present invention.

FIG. 5 depicts a generalized scheme 500 for propagating EthAIS frames in an Ethernet OAM hierarchy according to one embodiment of the present invention. A three-level hierarchy includes OAM domain 502 at Level-(i−1), OAM domain 504 at Level-(i) and OAM domain 506 at Level-(i+1). Associated with each OAM domain is a corresponding NMS entity operable to respond to any alarms generated by the domain. Accordingly, reference numerals 508(i−1), 508(i), and 508(i+1) refer to NMS entities associated with OAM domains 502, 504, and 506, respectively. In normal operation, each OAM domain is monitored by level-specific CC frames transmitted by the MEP nodes therein. If there is a fault in a level below the illustrated three-level hierarchy, the CC frame flow in each OAM domain is disrupted, thereby creating a CC loss failure therein, which is normally reported to the corresponding NMS although the fault occurred elsewhere. However, because of the AIS frames including fault location and level information that are propagated through the hierarchy, each OAM domain becomes aware that the fault lies somewhere else. Accordingly, alarms due to the CC loss in the respective OAM domains are suppressed.

By way of illustration, OAM domain 502 receives an AIS 510 from a lower level. As a result, alarm signaling 514(i−1) to NMS 508(i−1) due to CC frame loss 512(i−1) in OAM domain 502 (from its MEPs) is suppressed. Additionally, the fault location and level information is propagated by one or more MEP nodes of OAM domain 502 to its upper level domain, i.e., OAM domain 504, via a new AIS frame, AIS(i−1) 516. Upon receiving AIS(i−1) 516, OAM domain 504 likewise determines that its CC loss 512(i) should not be reported to the corresponding NMS 508(i). Accordingly, alarm signaling 514(i) therein is suppressed. Further, substantially similar to the behavior of OAM domain 502, a new AIS(i) 518 is propagated to the next higher level, i.e., Level-(i+1). Responsive to the contents of AIS(i) 518, OAM domain 506 also determines that its CC loss 512(i+1) need not be reported to the corresponding NMS 508(i+1), whereupon alarm signaling 514(i+1) is suppressed.

Those skilled in the art should recognize that a similar treatment is available where a fault is first detected at the server level of an Ethernet OAM network, except the initial fault indication is propagated through technology-specific server level messaging, rather than via AIS frame generation, to its upper level domain, e.g., operator-level domain. Thereafter, the MIP nodes of the operator-level domain generate Ethernet AIS frames accordingly, which are propagated up through the hierarchy of the Ethernet OAM network as described above.

Figure 6:
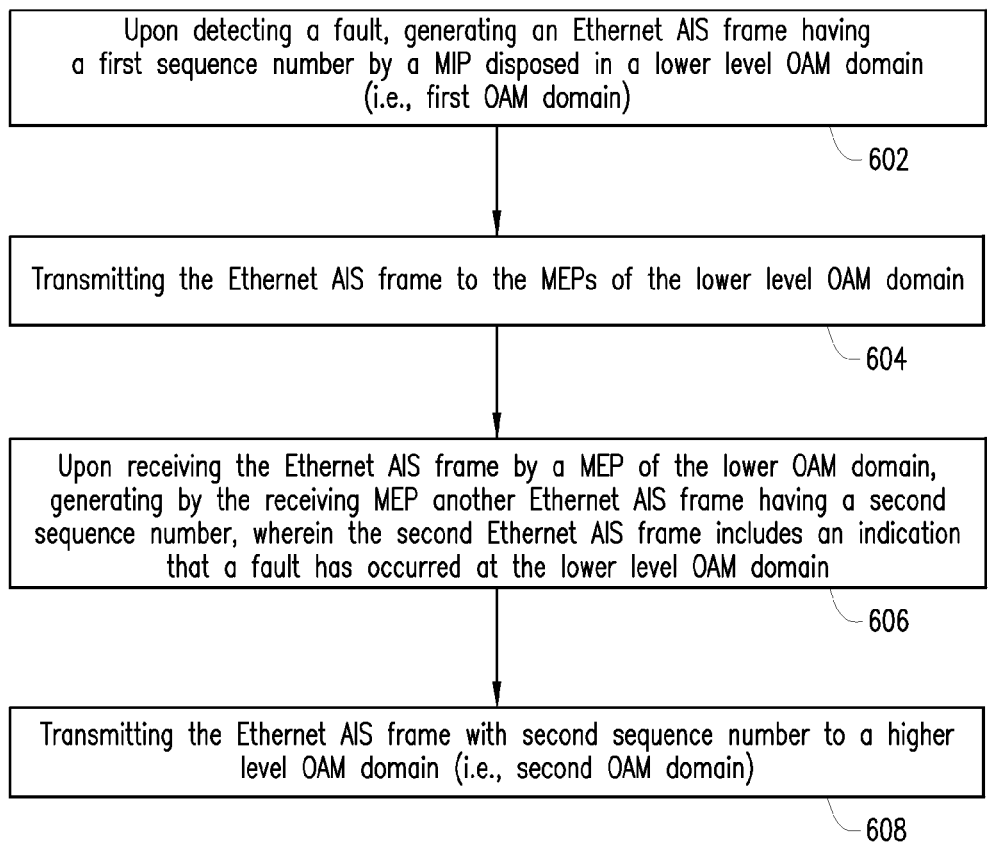
FIG. 6 is a flowchart of an EthAIS frame propagation method operable in an Ethernet OAM network according to one embodiment of the present invention.

Referring now to FIG. 6, shown therein is a flowchart of an EthAIS frame propagation method operable in an Ethernet OAM network according to one embodiment of the present invention. Upon detecting a fault, an Ethernet AIS frame having a first sequence number is generated by a MIP node disposed in a lower level OAM domain, i.e., a first OAM domain (block 602). In one implementation, one or more MIPs that are adjacent to the fault location are operable to generate such a frame and transmit it independently though the domain. Preferably, the MIP nodes multicast the generated AIS frame with first sequence number to the MEP nodes of the domain (block 604). Upon receiving the AIS frame by one or more MEP nodes of the first OAM domain, another Ethernet AIS frame having a second sequence number is generated by the receiving MEP nodes, wherein the second Ethernet AIS frame includes an indication that a fault has occurred at the lower level OAM domain (block 606). The second Ethernet AIS frame is then transmitted to a second OAM domain that is disposed at an immediately higher hierarchical level relative to the first OAM domain (block 608). Additionally, the receiving MEP nodes suppress generation of an alarm signal to an NMS entity associated with the second OAM domain that would have been caused by a loss of CC frames therein due the fault detected at the lower level.

Figure 7:
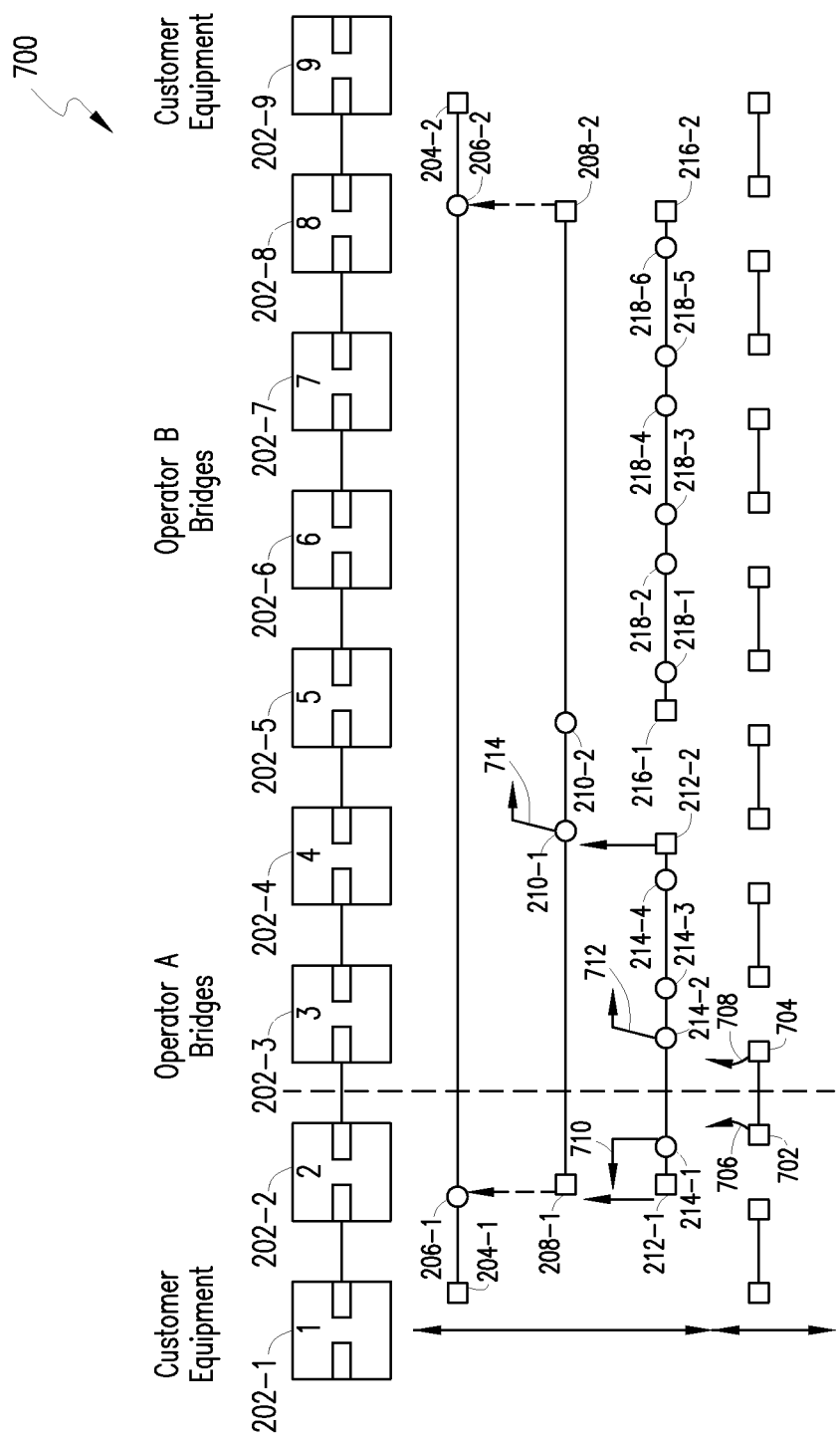
FIG. 7 depicts an embodiment of EthAIS frame propagation in an Ethernet OAM hierarchy responsive to a link failure.

FIG. 7 depicts an embodiment of EthAIS frame propagation scheme 700 in an Ethernet OAM hierarchy responsive to a link failure, wherein the plurality of bridges 202-1 through 202-9 described above with reference to FIG. 2 are exemplified. A link failure located at the server level between the adjacent server nodes 702 and 704 is detected by the server nodes, whereupon each server node respectively transmits a server-level-specific failure message 706, 708 to its corresponding MIP node 214-1, 214-2 disposed in the next higher level domain, i.e., the operator-level domain. Because of the fault, the server link effectuated between bridges 202-2 and 202-3 is no longer in operation, and the OAM domains accordingly experience a vertical breach that separates the domains into two sides. As illustrated, operator-level MIP nodes 214-1 and 214-2 belong to different sides of the breach, wherein each is operable to generate an AIS frame 710, 712 with the fault information for transmission to respective sides of the operator-level domain. In one implementation, AIS frames 710 and 712 are multicast by the MIPs periodically during the fault condition (e.g., one frame per second). Upon receiving the AIS frames 710 and 712, MEP nodes 212-1 and 212-2 of the operator-level domain generate, respectively, a new AIS frame having a sequence number that is different from the sequence number of the AIS frames received. In an exemplary embodiment, the MEP nodes 212-1 and 212-2 generate the new AIS frames after coalescing all the received AIS frames from the current level (i.e., the operator-level domain). Coalescing of the AIS frames may be preferred because a higher level domain (e.g., the customer-level domain) only needs to know that the fault is at the lower level (e.g., the provider-level), but it does not need to know how many faults are at the lower level, or which bridges at the lower level are faulty. Therefore, it is sufficient for an upper level OAM domain to receive one single AIS fault indication from the lower level OAM domain, irrespective of the number of faults from the lower level. Accordingly, it should be appreciated that coalescing of the AIS frames avoids flooding the OAM domain with unnecessary frames.

The operator-level MEPs 212-1 and 212-2 propagate the new AIS frames towards the provider-level domain, wherein they are similarly multicast to the remaining portions of domain. Reference numeral 714 refers to an AIS frame received by the provider-level MIP 210-1 from the operator-level MEP 212-2, that is transmitted to the provider-level MEP 208-2, which coalesces the AIS frames received thereat and propagates a yet another new AIS frame towards the customer-level domain. As illustrated, the customer-level MIP node 206-2 is operable to receive the new AIS frame from the provider-level domain, which is then multicast to the customer-level MEP nodes (e.g., MEP 204-2). As a result of the AIS propagation through the OAM hierarchy, the MEP nodes at each level are operable to determine that the failure condition in the network is due to a link fault in the server level, and accordingly, alarm signaling (due to the loss of CC frames in that level) to the NMS entity associated with each level is suppressed.

Figure 8:
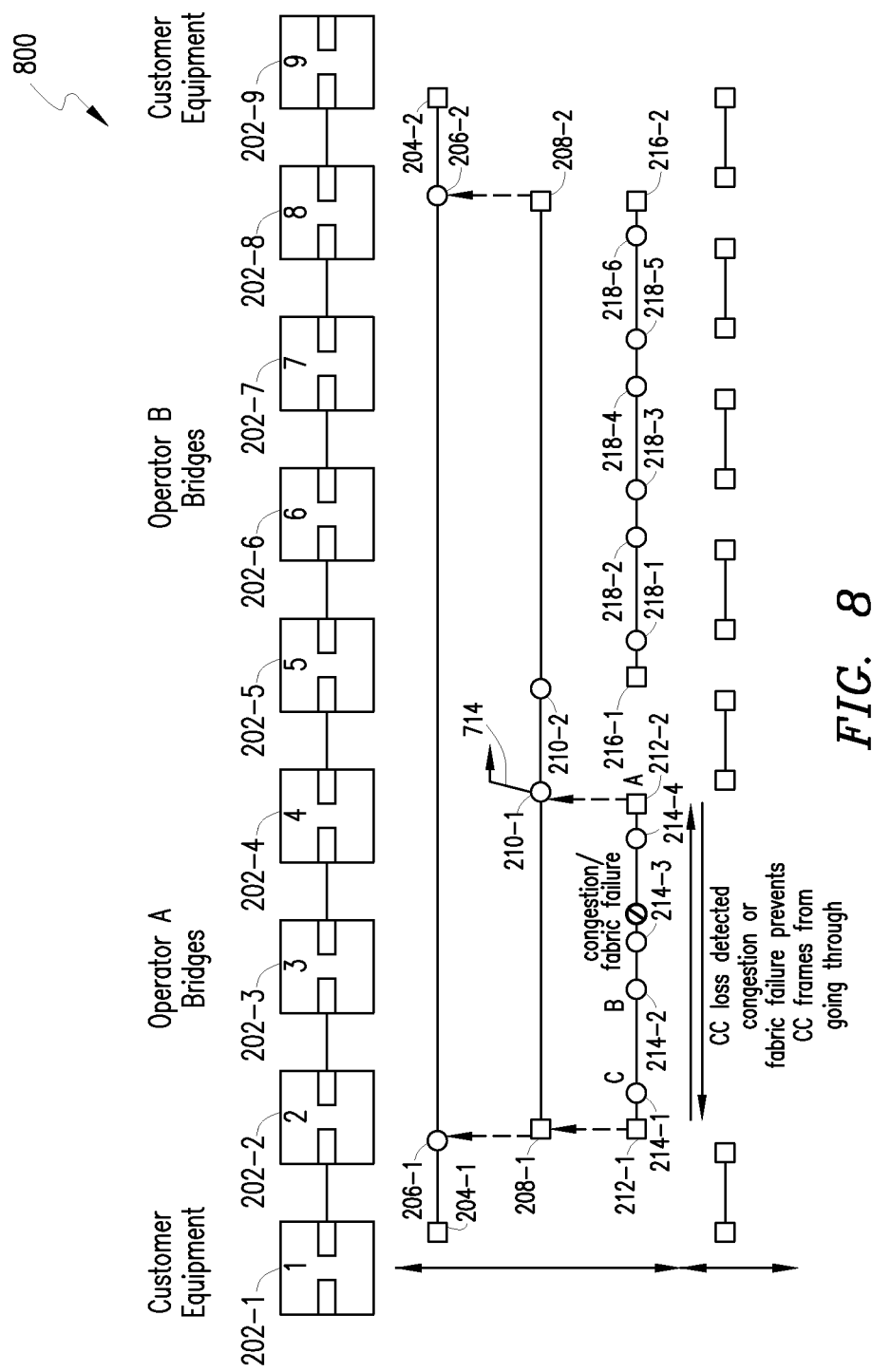
FIG. 8 depicts an embodiment of EthAIS frame propagation in an Ethernet OAM hierarchy responsive to a Continuity Check (CC) loss.

FIG. 8 depicts an embodiment of EthAIS frame propagation scheme 800 in an Ethernet OAM hierarchy responsive to a CC loss. Similar to the scenario depicted in FIG. 7, the plurality of bridges 202-1 through 202-9 are exemplified, wherein a congestion or fabric failure condition is encountered in the operator-level ME defined by MEP 212-1 and MEP 212-2. However, the underlying link experiences no fault condition. Fabric failure or congestion prevents CC frames from going through in the operator-level ME, which is detected only by the ME's end points, MEP 212-1 and 212-2. The MIP nodes adjacent to the fabric failure cannot detect it, however. Upon detection of the CC frame loss condition, the MEP nodes 212-1 and 212-2 respectively propagate Ethernet AIS frames to their corresponding nodes in the higher level domain (i.e., provider-level domain). A receiving MIP node, e.g., MIP 210-1, in the provider-level domain multicasts the frame 714 to the MEPs therein for effectuating alarm suppression (at that level) and AIS propagation to the next level (i.e., customer-level).

Figure 9:
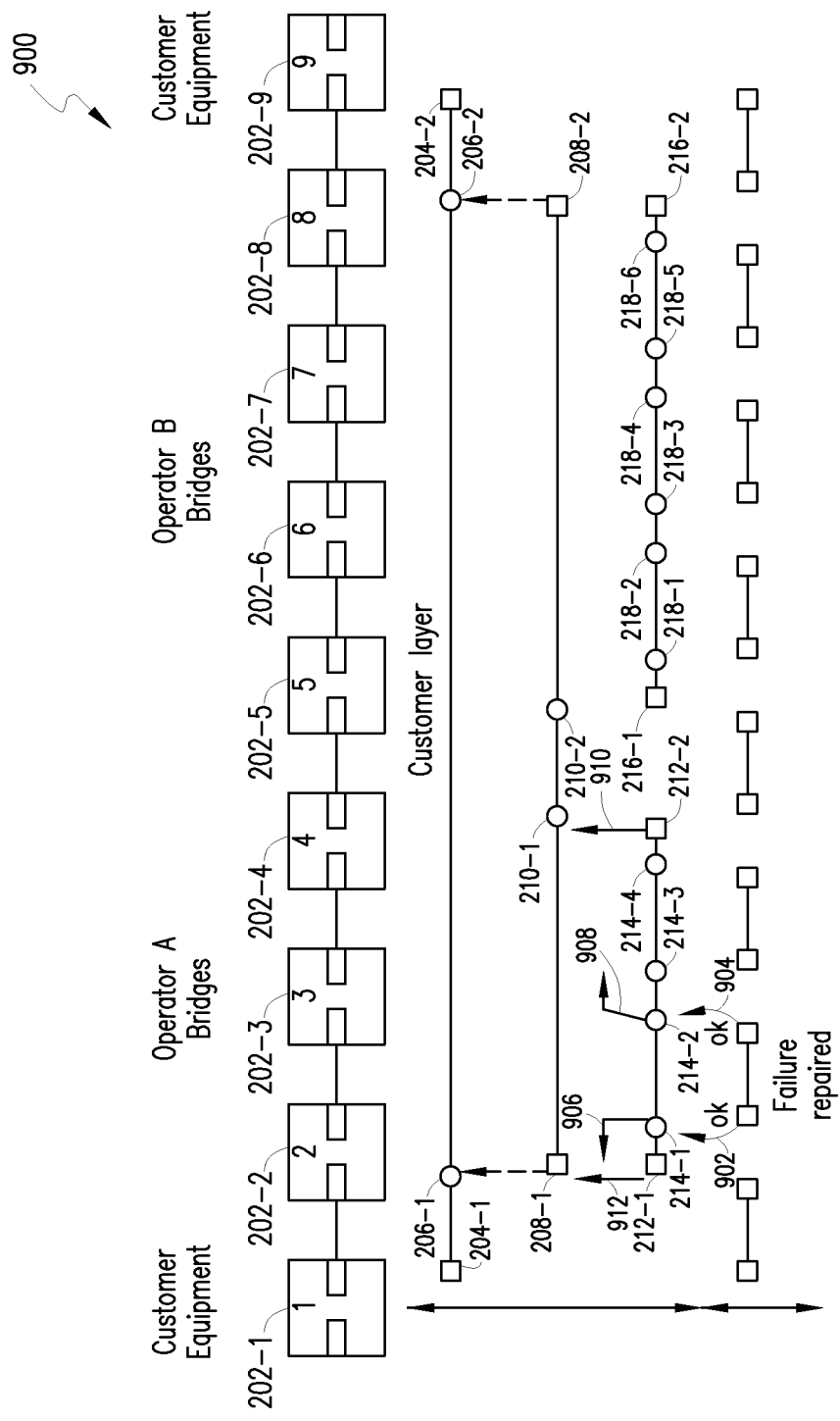
FIG. 9 depicts an embodiment of EthAIS frame propagation in an Ethernet OAM hierarchy to indicate clearance of a fault.

FIG. 9 depicts an embodiment of EthAIS frame propagation scheme 900 in an Ethernet OAM hierarchy for indicating clearance of a fault. Upon repairing a fault condition at the server level between bridges 202-2 and 202-3, appropriate signals 902, 904 are provided by the server nodes to the MIP nodes 214-1 and 214-2 in the operator-level domain. In a manner similar to the AIS frame generation in the event of a link failure, AIS Clear frames 906, 908 are generated by the MIPs adjacent to the link that has been repaired, which are propagated to their respective MEP nodes 212-1, 212-2. Thereafter, new AIS Clear frames (e.g., AIS Clear 912 and AIS Clear 910) are generated by the MEP nodes 212-1, 212-2 for propagation up through the OAM hierarchy. Those skilled in the art should recognize upon reference hereto that without a fault clearance indication scheme via AIS Clear frames, a MIP or MEP node at a given level would have to wait for an arbitrary number of AIS time periods during which no AIS indication is received to indicate or deem that the failure has cleared. By implementing AIS Clear frames, a positive confirmation that a failure has indeed cleared may be provided throughout the OAM hierarchy.

Based on the foregoing discussion, it should be apparent that AIS frame generation and propagation provides an advantageous scheme for transmitting fault location information in a multi-level Ethernet OAM hierarchy, whereby faults at various domain levels may be differentiated. Also, alarms at a particular level due to faults at lower levels are suppressed (i.e., not reported to the NMS entity associated with the particular level) because those faults would be fixed at the lower level. In addition, with Ethernet AIS, penalties may be imposed by a particular OAM domain (e.g., customer-level domain) on a lower level OAM domain (e.g., provider-level domain) where service unavailability occurs due to failures from the lower level OAM domain. Accordingly, customers can then obtain a refund based on service unavailability assignable to the lower level domains.

Certain technical issues arise, however, in implementing the AIS scheme in an exemplary Ethernet OAM network. First, simultaneous faults in Ethernet OAM domains trigger cascading of multiple AIS frames to upper domains that will result in unnecessary, excessive alarm traffic at upper levels. Further, with Ethernet AIS, it is sometimes possible to wrongly suppress alarms due to faults at a particular level that should be reported to the NMS at that level. For example, such a scenario may arise where AIS frames have been propagated from a lower level domain due to faults at that lower level, which cause nondiscriminatory suppression of alarm signaling at higher levels. The remainder of the present patent disclosure will set forth embodiments of various schemes that specifically address these issues.

Figure 10A:
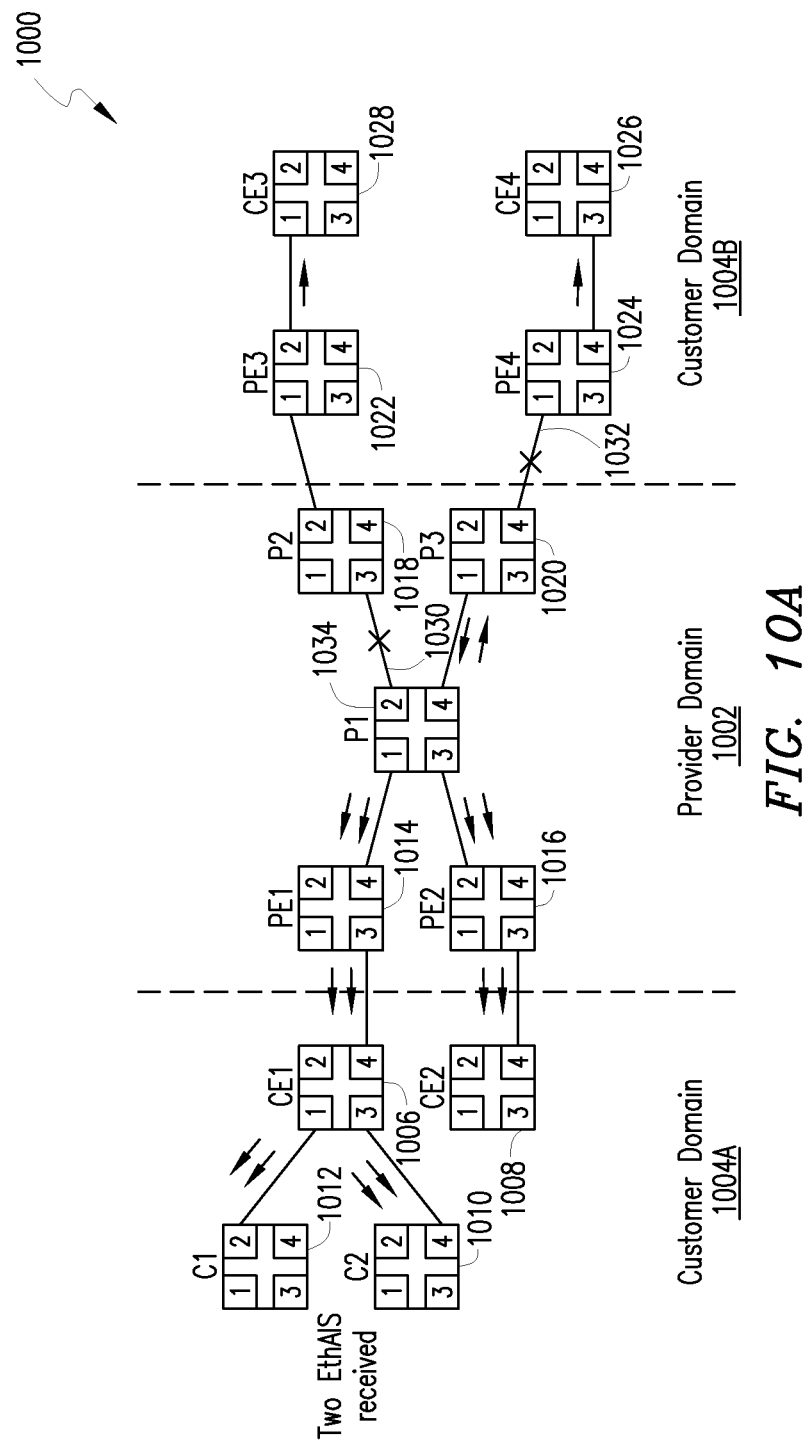
FIG. 10A depicts an embodiment of an Ethernet OAM hierarchy exemplifying multiple EthAIS frame generation.

FIG. 10A depicts an embodiment of an Ethernet OAM network 1000 exemplifying multiple EthAIS frame generation, wherein a provider domain 1002 is coupled to customer domain portions 1004A and 1004B. Provider bridge equipment P1 1034, P2 1018, and P3 1020 form an interior portion of the provider domain, which is interfaced to the customer domain via a plurality of Provider Edge (PE) bridges. By way of illustration, PE1 1014, PE2 1016, PE3 1022 and PE 1020 are provided. Customer domain portions 1004A and 1004B are likewise comprised of a plurality of customer bridges including Customer Edge (CE) bridges. As exemplified, C1 1012 and C2 1010 are coupled to CE1 1006 which, in turn, is interfaced to PE1 1014. Similarly, CE2 1008, CE3 1028, and CE4 1026 are interfaced to PE2 1016, PE3 1022, and PE4 1024, respectively. Furthermore, each of the various bridges in the network 1000 is shown with four ports by way of example.

Continuing to refer to FIG. 10A, two simultaneous faults 1030 and 1034 are exemplified within the provider domain, where fault 1030 occurs between P1 1034 and P2 1018 and fault 1032 occurs between P3 1020 and PE4 1024. As described in detail hereinabove, each fault independently gives rise to an Ethernet AIS frame in the provider domain. Accordingly, two separate AIS frames are received in the customer domain, signifying multiple faults in the lower level (i.e., the provider domain). As the number of faults in the provider level increases, the number of AIS frames in the customer level will correspondingly increase, resulting in excessive traffic. However, receiving such multiple AIS frames at an upper level does not provide any additional useful information, since any single AIS frame from the lower level will operate to suppress alarm signaling in the upper level.

Figure 10B:
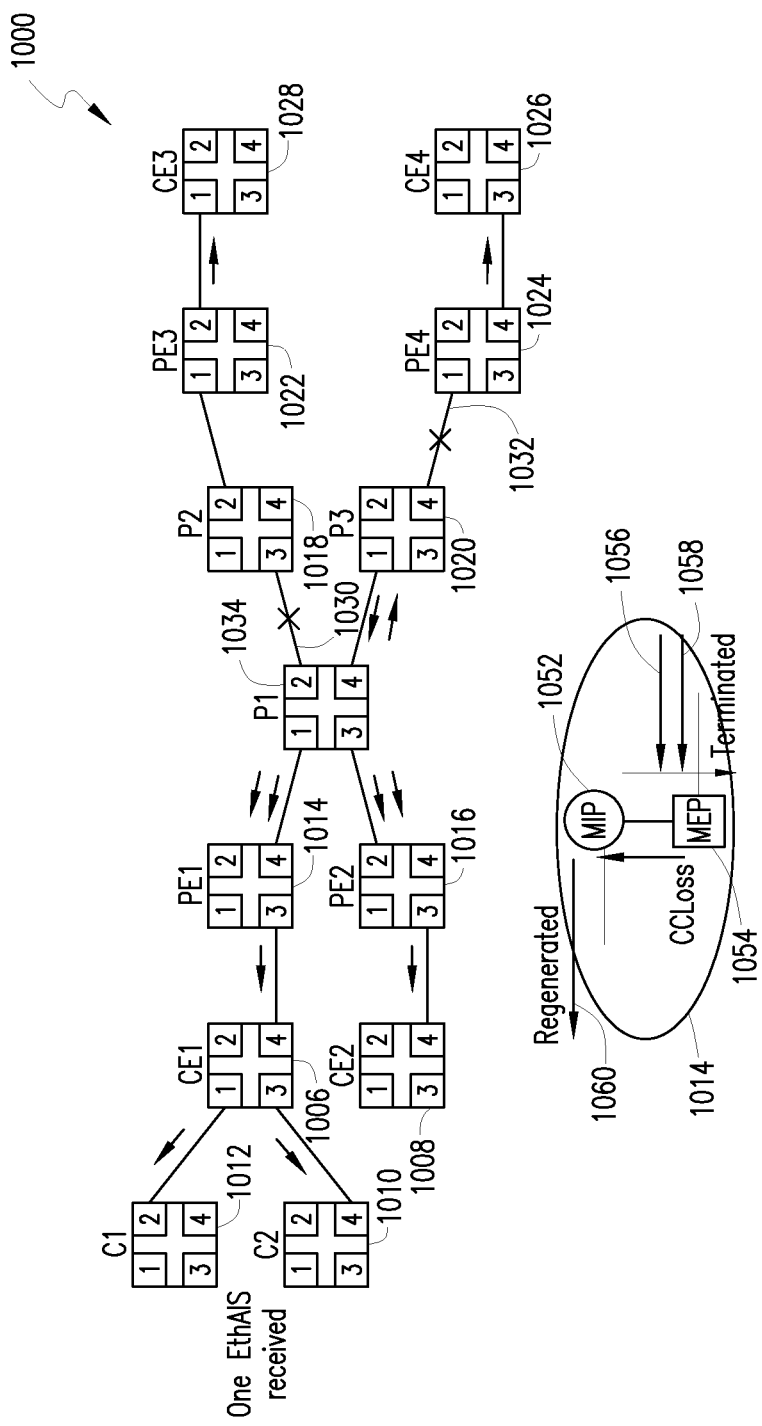
FIG. 10B depicts a scheme for optimizing multiple EthAIS frame flows from a single level in an Ethernet OAM hierarchy according to an embodiment of the present invention.

FIG. 10B depicts a scheme for optimizing multiple EthAIS frame flows from a single level in the Ethernet OAM network 1000 according to an embodiment of the present invention. Essentially, the solution involves the generation of Ethernet AIS frames towards an upper level domain only after detection of a CC frame loss at the current level. As shown before, faults 1030 and 1032 give rise to two independent AIS frames that are propagated towards the customer domain. First, in an exemplary ME involving PE1, corresponding AIS flows 1056, 1058 reach PE1 1014, where a MEP 1054 (effectuated at port 3 of PE1) terminates the flows. In parallel, MEP 1054 also continuously monitors the reception of CC frames from other MEPs in the provider domain. If its misses one or more CC frames, it triggers a CC loss alarm indicating that remote MEPs in the provider domain are not sending CC frames and are thus unreachable. In the example shown in FIG. 10B, faults 1030 and 1032 prevent the MEP node 1054 from receiving CC frames from other MEP nodes of the provider domain, thereby triggering the generation of CC loss alarms. A single AIS frame 1060 is thus regenerated and transmitted towards the customer domain via MIP 1052, which then multicasts the frame 1060 in the customer domain.

Figure 11:
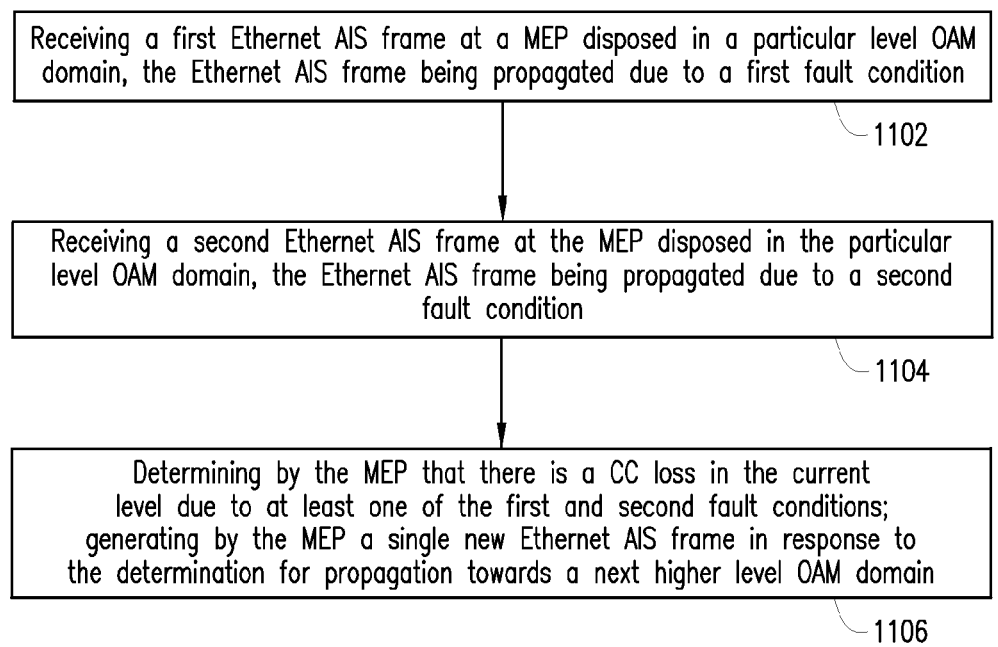
FIG. 11 is a flowchart of an AIS frame propagation method according to an embodiment of the present invention.

The foregoing scheme of AIS frame propagation method is set forth as a flowchart in FIG. 11 in accordance with an embodiment of the present invention. As provided in block 1102, a first Ethernet AIS frame is received at a MEP node disposed in a particular level OAM domain, wherein the Ethernet AIS frame is propagated due to a first fault condition. Also, a second Ethernet AIS frame is received by the MEP node of the particular level OAM domain, the second AIS frame being propagated responsive to a second fault condition (block 1104). A determination is made by the logic provided with the MEP node that there is a CC frame loss in the current level domain, i.e., the particular level domain, due to at least one of the first and second fault conditions. Responsive to the determination, the MEP node terminates the first and second AIS frames and generates a single new Ethernet AIS frame for propagation towards a next higher level OAM domain (block 1106).

Figure 12A:
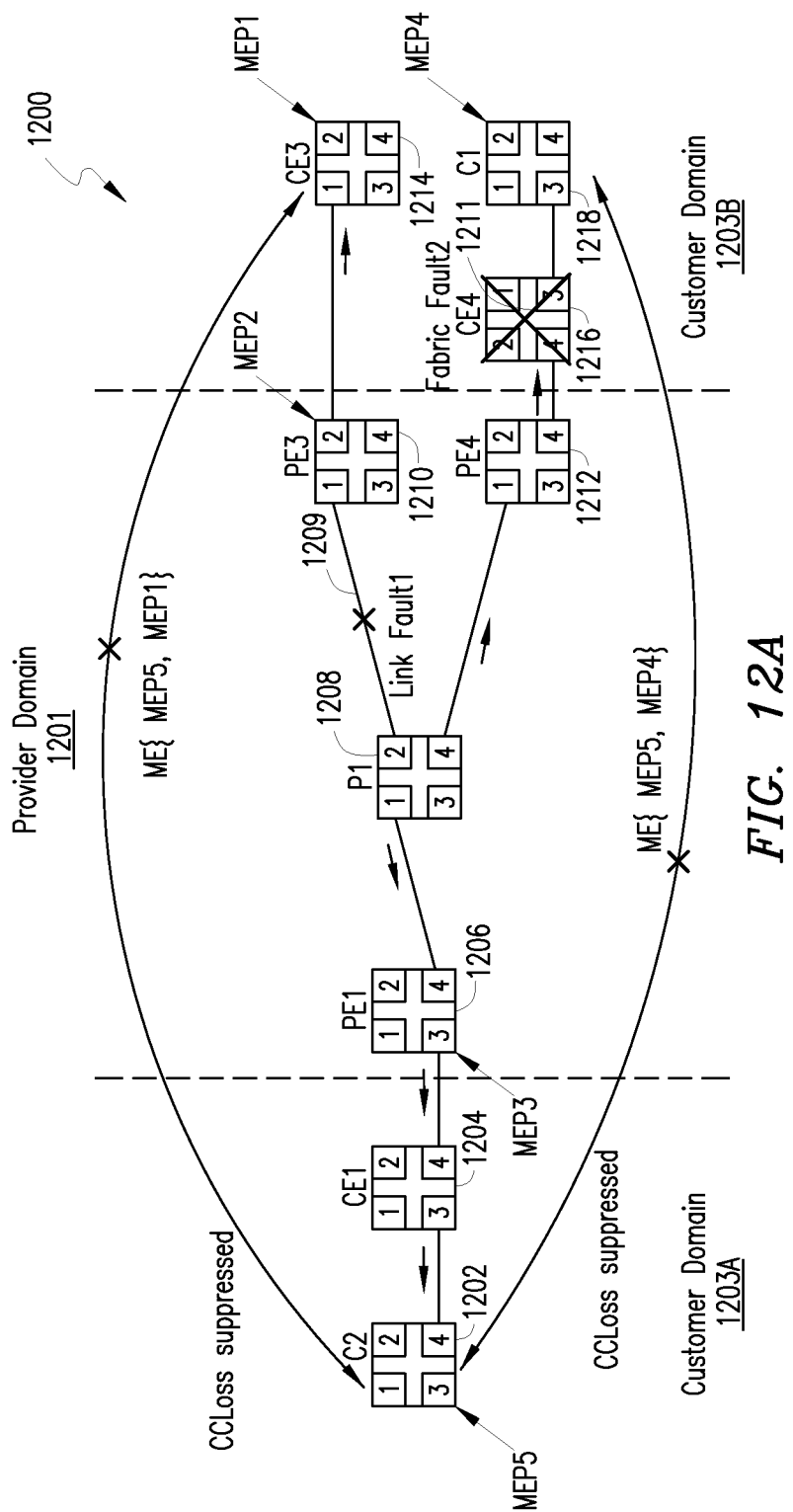
FIG. 12A depicts an embodiment of an Ethernet OAM hierarchy where nondiscriminatory suppression of alarms is exemplified.

FIG. 12A depicts an embodiment of an Ethernet OAM network 1200 where nondiscriminatory suppression of alarms is exemplified. Similar to the Ethernet OAM network 1000 described above, a plurality of bridges are organized into a provider domain 1201 and customer domain portions 1203A, 1203B. As illustrated, PE1 1206, P1 1208, PE3 1210, and PE4 1212 are disposed in the provider domain 1201. Likewise, the customer domain portions 1203A and 1203B respectively comprise C2 1202 and CE1 1204, and CE3 1214, CE4 1216 and C1 1218. By way of example, two ME systems are provisioned in the customer domain: ME{MEP5, MEP1} and ME{MEP5, MEP4}, wherein MEP5 is configured at port 3 of C2 1202, MEP1 is configured at port 2 of CE3 1214, and MEP4 is configured at port 4 of C1. Accordingly, customer-level CC frames are passed through each ME system as provided in the OAM architecture. Those skilled in the art should readily recognize that in normal operation, one set of CC frames traverse the bridges C2 1202, CE1 1204, PE1 1206, P1 1208, PE3 1210, CE3 1214 as part of the ME {MEP5, MEP1} system, and another set of CC frames traverse the bridges C2 1202, CE1 1204, PE1 1206, P1 1208, PE4 1212, CE4 1216, C1 1218 as part of the ME{MEP5, MEP4} system.

A link fault 1209 is exemplified in the provider domain 1201 between P1 1208 and PE3 1210, which gives rise to Ethernet AIS frame generation and propagation towards the upper level domain, i.e., the customer domain. As a result of the link fault, however, the CC frames involving ME {MEP5, MEP 1} are lost. As described in detail hereinabove, the AIS frames due to the link fault 1209 in the provider domain eventually arrive at the boundary MEP nodes of the customer domain, whereupon alarm signaling due to the loss of customer CC frames (caused by the link fault) is suppressed. On the other hand, since the Ethernet AIS mechanism currently effectuates nondiscriminatory suppression of all alarms in a particular level, if there are faults that are specific to that particular level (which need to be reported), and CC losses due to such faults are also suppressed. As exemplified in FIG. 12A, a fabric fault 1211 at CE4 1216 (in the customer domain) which creates the loss of CC frames involving ME {MEP5, MEP4} is erroneously suppressed in the customer domain.

Figure 12B:
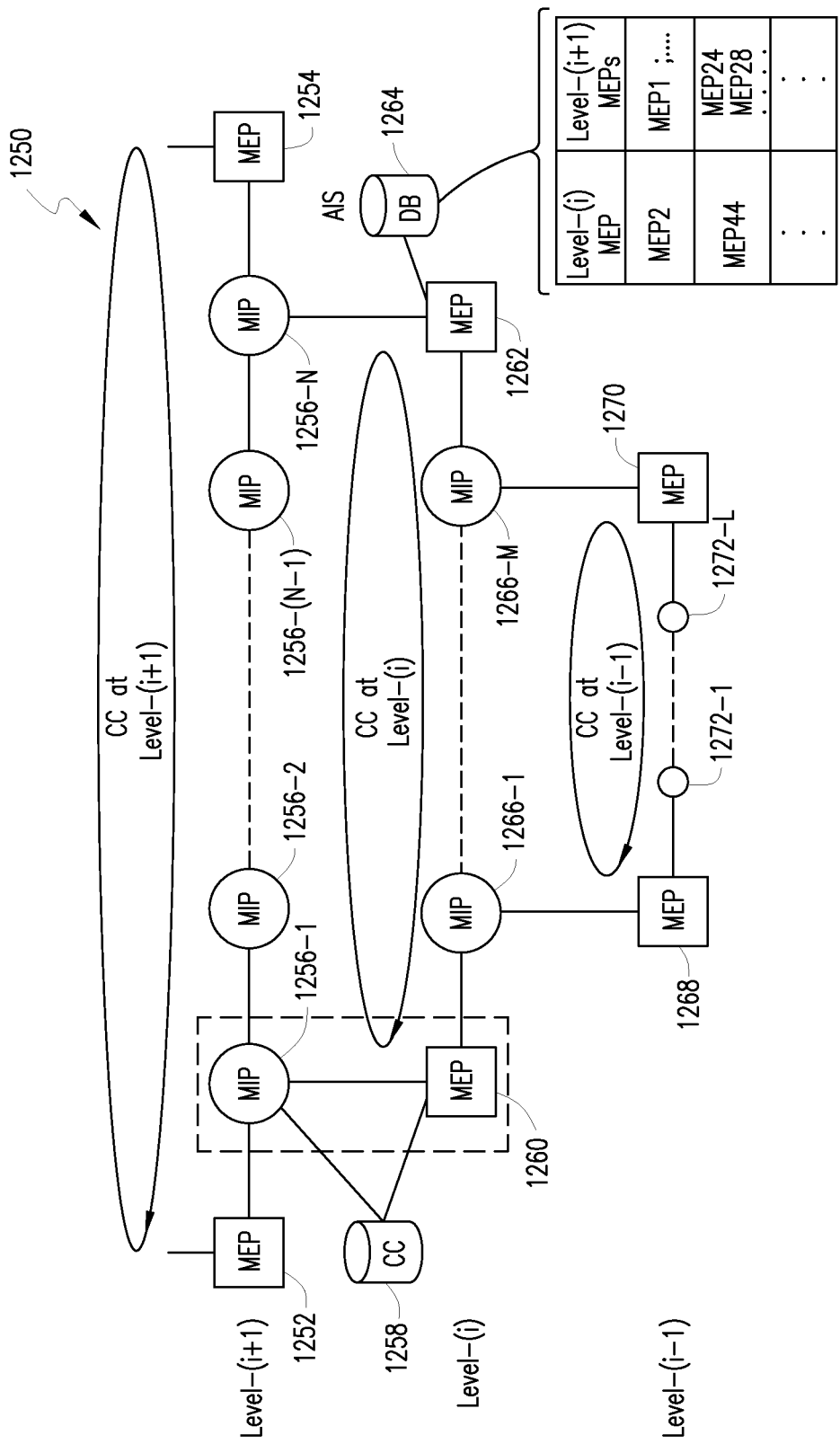
FIG. 12B depicts a generalized scheme for effectuating intelligent alarm suppression in an Ethernet OAM hierarchy according to an embodiment of the present invention.

FIG. 12B depicts a generalized scheme 1250 for effectuating intelligent alarm suppression in an Ethernet OAM hierarchy according to an embodiment of the present invention.

Three levels of OAM domains, Level-(i−1), Level-(i) and Level-(i+1), are exemplified, each domain having its own CC frame circulation. At Level-(i+1), the OAM domain includes MEP 1252 and MEP 1254, with a plurality of MIP nodes 1256-1 through 1256-N therebetween. Likewise, at Level-(i), the OAM domain includes MEP 1260 and MEP 1262, with a plurality of MIP nodes 1266-1 through 1266-M therebetween, and at Level-(i−1), the OAM domain includes MEP 1268 and MEP 1270, with a plurality of MIP nodes 1272-1 through 1272-L therebetween.

In a learning phase, a lower level MEP node obtains the knowledge of its upper level MEP topology by monitoring the upper level CC frames passing through the same bridge that effectuates both the lower level MEP and the corresponding upper level MIP. As illustrated in FIG. 12B, MEP 1260 of Level-(i) and MIP 1256-1 of Level-(i+1) are effectuated in the same bridge equipment. MIP 1256-1 is operable to snoop on Level-(i+1) CC frames passing through them, and by examining the contents thereof, MIP 1256-1 can determine that MEPs 1252 and 1254 reside in Level-(i+1) domain. The upper level MEP information may be stored in a CC database 1258, which in essence identifies all reachable MEPs of the upper level domain. Since the lower level MEP, i.e., MEP 1260, has access to the CC database 1258, the upper level MEP topology information may be provided to the remaining MEP nodes of that level, i.e., Level-(i), via Level-(i) CC frames. Although only a single remote MEP (e.g., MEP 1262) is shown in Level-(i), it should be apparent that multiple remote MEPs may be provisioned therein, each receiving the CC frames with the upper level MEP information. A number of modes of transmission are possible with respect to distributing the upper level MEP information. In one implementation, only changes in the database 1258 may be transmitted via the CC frames when applicable. Although this implementation is scalable, synchronization is more difficult. In another implementation, the complete CC database 1258 may be transmitted in every CC frame, which provides a reliable, albeit less scalable, solution. In a still further implementation, a hybrid mechanism involving the above two approaches may be provided.

Remote MEP nodes receiving a CC frame tagged with the additional upper level MEP topology information are operable to construct a corresponding AIS database that includes reachable (and conversely, unreachable) upper level MEP nodes. By way of illustration, remote MEP 1262 of Level-(i) constructs AIS database 1264 based on the information received via the Level-(i) CC frames from MEP 1260. As an example, the entries of AIS database 1264 may be read as follows: "MEP 1, . . . of Level-(i+1) reside behind MEP2 of Level-(i) which provided this topology information via its CC frames."

Similar to the construction of AIS database 1264 at Level-(i), each level in a particular Ethernet OAM hierarchy may build its own upper level MEP topology database. In other words, an AIS database may be constructed by a MEP node at Level-(i−1) that includes reachable/unreachable MEP topology information learnt by examining CC frames of Level-(i). Once the AIS databases are appropriately constructed in the network, the contents thereof can be used in generating Ethernet AIS frames with appropriate upper level MEP information, which will be used in suppressing certain kinds of alarms (due to faults from lower levels) while allowing the remaining alarms (due to faults at current level) as set forth below.

Figure 12C:
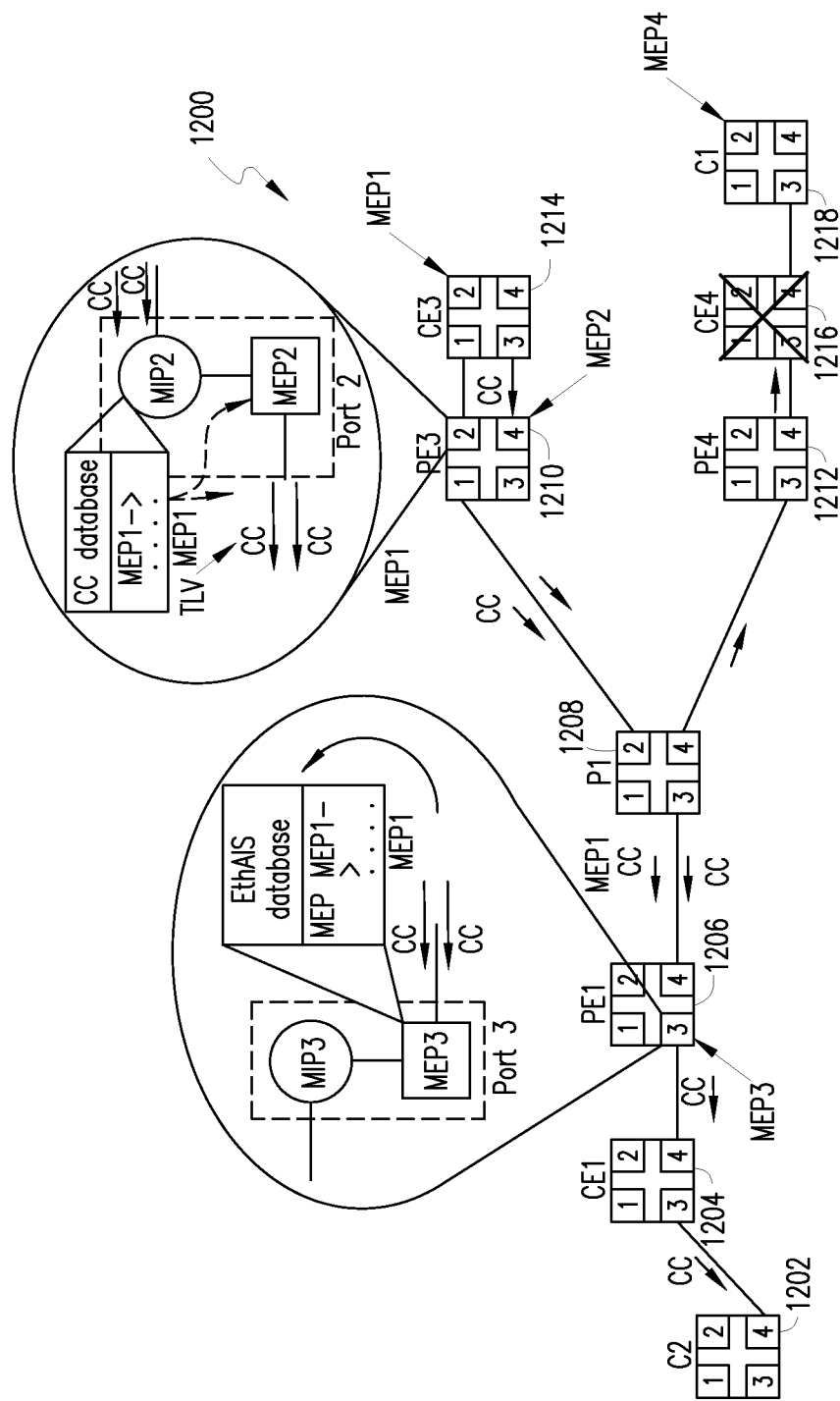
FIG. 12C depicts an embodiment of a learning phase in effectuating intelligent alarm suppression in an Ethernet OAM hierarchy according to an embodiment of the present invention.

FIG. 12C depicts an embodiment of a learning phase in effectuating intelligent alarm suppression in the Ethernet OAM network 1200 described above. During the learning phase, every customer MIP at the edge of the provider domain snoops on customer CC frames that pass through them. Since these customer MIPs are effectuated on the bridges that belong to the provider network, the provider can effectively use them to snoop on customer CC frames.

As illustrated in FIG. 12C, MIP2 (in PE3 1210 at port 2) learns by examining the CC frames from MEP1 in the customer domain, whereupon its stores this information in a CC database associated therewith. The provider MEP2 (beneath the customer MIP2) multicasts provider CC frames towards all other MEPs in the provider network. As explained above, MEP2 also has access to the same CC database as MIP2 since it resides on the same port as MIP2. The information collected in the CC database is transmitted across the provider network towards the remaining provider MEPs through CC frames that include appropriate TLV fields. Accordingly, MEP3 at PE1 1206 will receive the provider CC frames and terminate them. It then strips off the CC database information, i.e., TLV-based customer MEP information, which is stored in a new Ethernet AIS database that is indexed by sending MEPs.

Figure 12D:
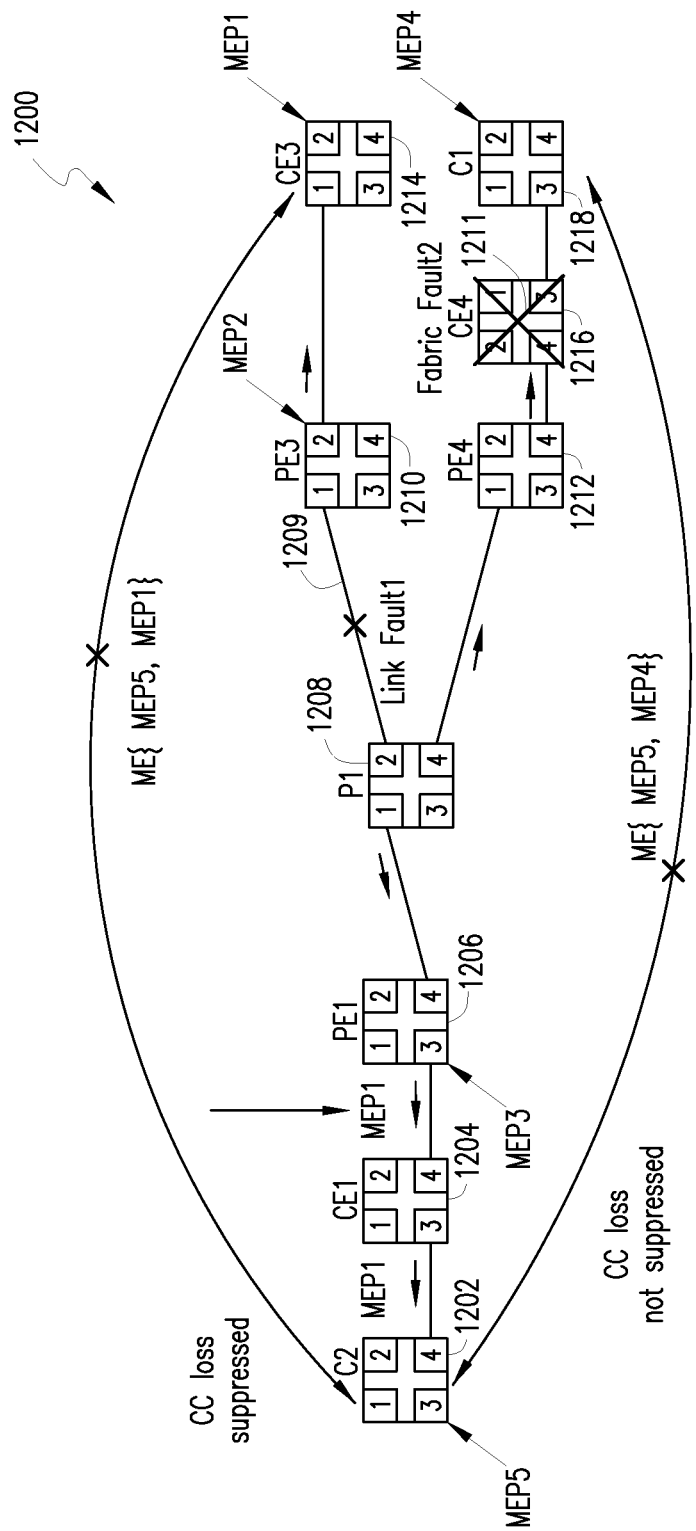
FIG. 12D depicts an embodiment of a frame generation phase in effectuating intelligent alarm suppression in an Ethernet OAM hierarchy according to an embodiment of the present invention.

FIG. 12D depicts an embodiment of a frame generation phase in effectuating intelligent alarm suppression in the Ethernet OAM network 1200. As before, link fault 1209 between P1 1208 and P1 1210 gives rise to a CC frame loss between MEP3 (port 3 at PE1 1206) and MEP2 (port2 at PE3 1210) in the provider domain. This loss indicates that MEP2 is unreachable. PE1 1206 queries its Ethernet AIS database and determines that MEP1 at the customer level resides behind MEP2 and is therefore unreachable as well. An Ethernet AIS frame is generated by MEP3 towards the customer domain in response to this CC loss. MEP3 adds in this AIS frame the upper level MEP topology information acquired during the learning phase with respect to the unreachable MEP1 at the customer level. In one implementation, the MEP1 identifier is inserted into the AIS frame as a TLV field. Thereafter, the AIS frame is multicast towards the customer domain.

Upon receiving the AIS frame with the additional TLV field containing the MEP1 identifier, MEP5 (port 3 at C2 1202) determines that the CC frame loss with respect to ME {MEP5, MEP 1} is due to a failure in the provider domain and MEP 1 has become unreachable because of it. MEP5 can thus safely suppress the CC loss in ME{MEP5, MEP1}. On the other hand, other CC losses, e.g., CC loss in ME{MEP5, MEP4}, are not suppressed. That is, such other CC losses as pertaining to a failure in the current level (e.g., fabric failures in the customer domain, such as the fabric failure 1211 at CE4 1216) will be reported to its NMS.

Figure 13:
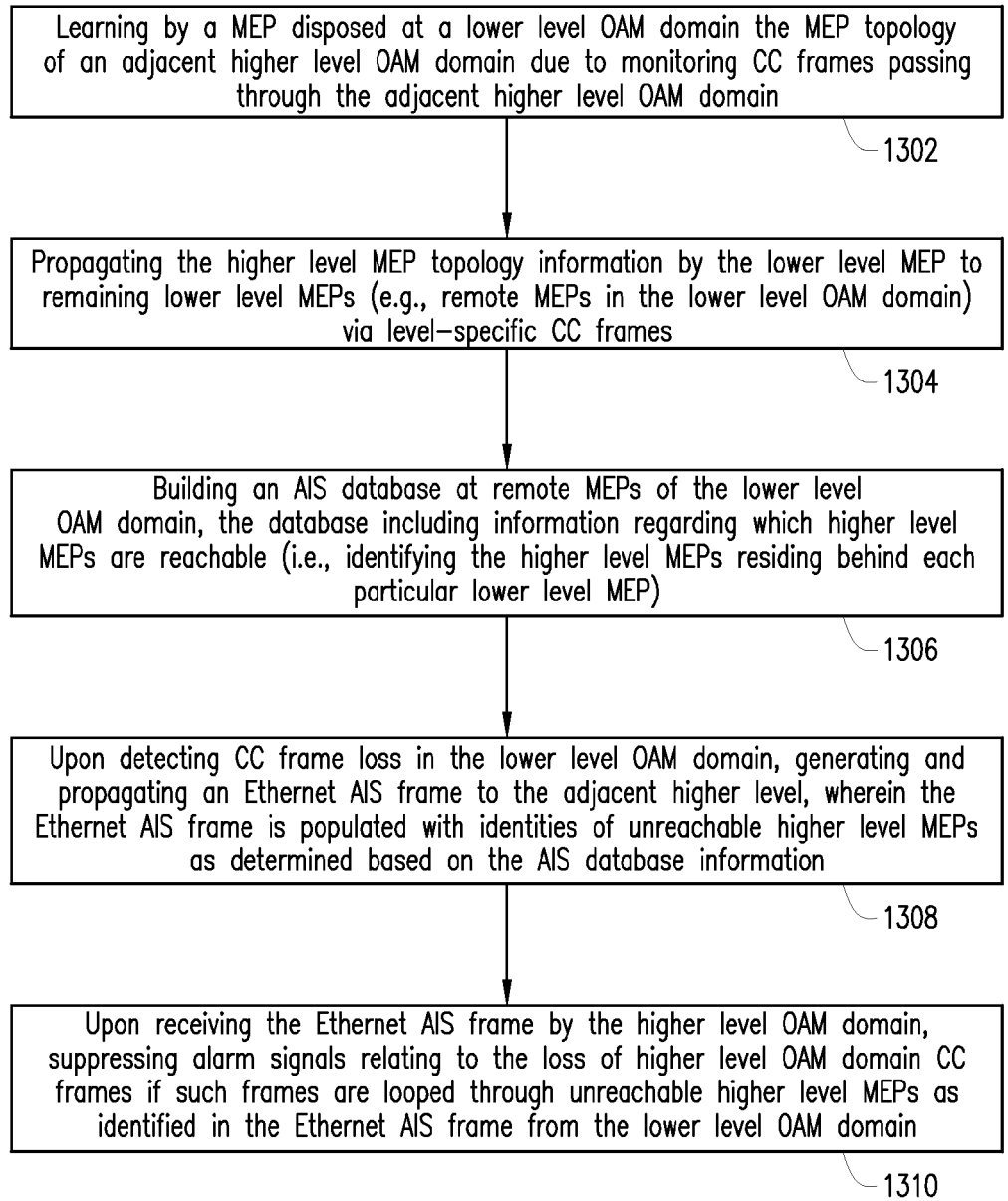
FIG. 13 is a flowchart of an intelligent alarm suppression method in an Ethernet OAM hierarchy according to an embodiment of the present invention.

FIG. 13 is a flowchart of an intelligent alarm suppression method in an Ethernet OAM hierarchy according to an embodiment of the present invention. As provided in block 1302, a MEP node disposed at a lower level OAM domain learns the MEP topology of an adjacent higher level OAM domain due to monitoring of CC frames passing through the adjacent higher level OAM domain. The higher level MEP topology information is propagated by the lower level MEP to the remaining lower level MEP nodes (i.e., remote MEPs) via lower level CC frames (block 1304). An AIS database is built at one or more remote MEPs of the lower level OAM domain, wherein the database includes information regarding which higher level MEPs are unreachable (i.e., identifying the higher level MEPs residing behind each particular lower level MEP) (block 1306). Upon detecting a CC frame loss in the lower level OAM domain, an Ethernet AIS frame is generated and propagated to the adjacent higher level, wherein the Ethernet AIS frame is populated with identities of unreachable higher level MEPs as determined based on the AIS database information (block 1308). After receiving the Ethernet AIS frame by the higher level OAM domain, the MEPs therein determine which of the higher level CC losses are due to failures from below (based on the AIS database information that indicates which higher level MEPs are behind the unreachable lower level MEPs). Responsive thereto, alarm signals relating to the loss of higher level OAM domain CC frames that are intended for looping through an unreachable higher level MEP are suppressed (block 1310). As pointed out earlier, alarms relating to other CC frame losses are not suppressed and are duly reported to an NMS entity associated with the higher level OAM domain.

Based on the foregoing Detailed Description, it should be appreciated that the present invention advantageously provides an alarm indication and suppression mechanism in an Ethernet OAM hierarchy. Although the invention has been described with reference to certain exemplary embodiments, it is to be understood that the forms of the invention shown and described are to be treated as exemplary embodiments only. Accordingly, various changes, substitutions and modifications can be realized without departing from the spirit and scope of the invention as defined by the appended claims.

What is claimed is:

1. A method operable in a Maintenance End Point (MEP) node for an Ethernet network, wherein the Ethernet network is logically segmented into multiple Operations, Administration and Maintenance (OAM) domains and the MEP node is associated with a first OAM domain having a first assigned level, comprising:
   determining by said MEP node that a loss of Continuity Check (CC) frames has occurred in the first OAM domain having the first assigned level;
   receiving an Ethernet Alarm Indication and Suppression (AIS) frame by the MEP node associated with the first OAM domain, wherein the Ethernet AIS frame indicates a fault condition has been detected in a second OAM domain having a second assigned level, wherein the first assigned level of the first OAM domain is at a higher hierarchical level than the second assigned level of the second OAM domain; and
   responsive to the Ethernet AIS frame that indicates a fault condition has been detected in the second OAM domain, suppressing generation of an alarm due to the loss of Continuity Check frames in the first OAM domain.

2. The method of claim 1, wherein the first assigned level of the first OAM domain corresponds to a customer domain and wherein the second assigned level of the second OAM domain corresponds to at least one of: a provider domain and an operator domain.

3. The method of claim 1, wherein the first assigned level of the first OAM domain is an operator level and wherein the second assigned level is a server level.

4. The method of claim 1, wherein one or more ports of the MEP node are associated with the first OAM domain having the first assigned level.

5. The method of claim 1, wherein suppressing the generation of the alarm includes:
   suppressing generation of the alarm due to the loss of Continuity Check frames in the first OAM domain to a network management system entity associated with the first OAM domain.

6. The method of claim 1, further comprising:
   in response to receiving the Ethernet AIS frame, transmitting a next Ethernet AIS frame that indicates a fault condition has been detected in a lower level OAM domain to a third OAM domain having a third assigned level.

7. The method of claim 1, wherein the fault condition detected in the a second OAM domain includes at least one of: link failure, congestion and continuity check frame loss.

8. A method operable in a network entity configured as a Maintenance End Point (MEP) bounding a first maintenance entity with an assigned first maintenance entity level in an Ethernet network, wherein the Ethernet network has been configured with multiple designated maintenance entity levels, comprising:
   receiving an Alarm Indication and Suppression (AIS) frame by the MEP node, wherein the AIS frame indicates a fault condition has been detected in a second maintenance entity with an assigned second maintenance entity level;
   detecting by the MEP node that a loss of Continuity Check (CC) frames has occurred in the first maintenance entity; and
   responsive to the AIS frame, suppressing generation of a loss of continuity alarm that would indicate the loss of CC frames in the first maintenance entity; and
   wherein the first maintenance entity level of the first maintenance entity is at a higher hierarchical level than the second maintenance entity level of the second maintenance entity.

9. The method of claim 8, wherein the first maintenance entity level of the first maintenance entity corresponds to a customer domain and wherein the second maintenance entity level of the second maintenance entity corresponds to at least one of: a provider domain and an operator domain.

10. The method of claim 8, wherein the first maintenance entity level of the first maintenance entity is an operator level and wherein the second maintenance entity level is a server level.

11. The method of claim 8, wherein suppressing the generation of the loss of continuity alarm includes:
    suppressing generation of the loss of continuity alarm to a network management system associated with the first maintenance entity.

12. The method of claim 8, further comprising:
    in response to receiving the AIS frame, transmitting a next Ethernet AIS frame that indicates a fault condition has been detected in a lower level maintenance entity to a third maintenance entity having an assigned third maintenance entity level, wherein the third maintenance entity level is at a higher hierarchical level than the first maintenance entity level.

13. The method of claim 8, wherein the fault condition detected in the second maintenance entity includes at least one of: link failure, congestion and continuity check frame loss.

14. A network entity configured as a Maintenance End Point (MEP) for bounding a first maintenance entity with an assigned first maintenance entity level in an Ethernet network, wherein the Ethernet network has been configured with multiple designated maintenance entity levels, wherein the network entity is configured to:
    receive an Alarm Indication and Suppression (AIS) frame by the network entity, wherein the AIS frame indicates a fault condition has been detected in a second maintenance entity with an assigned second maintenance entity level, wherein the first maintenance entity level of the first maintenance entity is at a higher hierarchical level than the second maintenance entity level of the second maintenance entity;
    detect by the network entity that a loss of Continuity Check (CC) frames has occurred in the first maintenance entity; and responsive to the AIS frame, suppress by the network entity generation of a loss of continuity alarm that would indicate the loss of CC frames in the first maintenance entity; wherein the network entity includes a bridge node for the Ethernet network and configured as a MEP of the first maintenance entity level.

15. The network entity of claim 14, wherein the network entity is further configured to:
in response to receiving the AIS frame, transmit a next Ethernet AIS frame that indicates a fault condition has been detected in a lower level maintenance entity to a third maintenance entity having an assigned third maintenance entity level, wherein the third maintenance entity level is at a higher hierarchical level than the first maintenance entity level.

16. The network entity of claim 14, wherein the fault condition detected in the second maintenance entity includes at least one of: link failure, congestion and continuity check frame loss.

17. A system in an Ethernet network having multiple designated hierarchical levels of maintenance entities bounded by two or more Maintenance End Point (MEP) nodes, the system comprising:
a first MEP node bounding a first lower level maintenance entity and configured to, responsive to determining a fault condition in the first lower level maintenance entity, generate an Alarm Indication and Suppression (AIS) frame that indicates the fault condition has occurred in the first lower level maintenance entity; and
a second MEP node bounding a second higher level maintenance entity and configured to:
receive the AIS frame;
detect that a loss of Continuity Check (CC) frames has occurred in the second higher level maintenance entity; and
responsive to the AIS frame, suppress generation of a loss of continuity alarm that would indicate the loss of CC frames in the second higher level maintenance entity.

18. The system of claim 17, wherein the first MEP node is a first bridge node in the Ethernet network and configured as a MEP of the first maintenance entity level and the second MEP node is a second bridge node in the Ethernet network and configured as a MEP of the second maintenance entity level.

19. The system of claim 17, wherein the first MEP node is a first bridge node in the Ethernet network and configured at a server level to the second MEP node of the second maintenance entity level.

20. The system of claim 17, wherein the second MEP node is further configured to:
in response to receiving the AIS frame, generate a next AIS frame that indicates a fault condition has been detected in a lower level maintenance entity.

21. The system of claim 20, further comprising:
a third MEP node bounding a third maintenance entity, wherein the third maintenance entity is at a higher hierarchical level than the second higher level maintenance entity, wherein the third MEP node is configured to:
receive the next AIS frame;
detect that a loss of Continuity Check (CC) frames has occurred in the third level maintenance entity; and
responsive to the next AIS frame, suppress generation of a loss of continuity alarm that would indicate the loss of CC frames in the third level maintenance entity.

* * * * *